(12) United States Patent  
Haiping et al.

(10) Patent No.: US 7,871,533 B1  
(45) Date of Patent: Jan. 18, 2011

(54) CARBON NANOPARTICLE-CONTAINING NANOFLUID

(75) Inventors: Hong Haiping, Rapid City, SD (US); John Andrew Waynick, San Antonio, TX (US)

(73) Assignee: South Dakota School of Mines and Technology, Rapid City, SD (US)

(*) Notice: Subject to any disclaimer, the term of this patent is extended or adjusted under 35 U.S.C. 154(b) by 0 days.

(21) Appl. No.: 11/494,954

(22) Filed: Jul. 28, 2006

Related U.S. Application Data

(63) Continuation-in-part of application No. 11/332,679, filed on Jan. 12, 2006, and a continuation-in-part of application No. 11/332,682, filed on Jan. 12, 2006.

(51) Int. Cl.  
*C09K 3/18* (2006.01)

(52) U.S. Cl. .............. 252/70; 252/71; 252/73; 252/74; 252/402; 508/345; 508/413; 977/742; 977/750; 977/752; 977/773; 977/902

(58) Field of Classification Search .......... 252/71, 252/502, 511, 70, 73, 74, 402; 165/8.4, 80.4; 424/46; 428/408, 901; 423/447.1; 508/128, 508/345, 413; 977/742, 750, 752, 773, 902  
See application file for complete search history.

(56) References Cited

U.S. PATENT DOCUMENTS

| | | | |
|---|---|---|---|
| 5,958,849 A * | 9/1999 | Hewson et al. ............ 508/345 |
| 6,221,275 B1 | 4/2001 | Choi et al. | |
| 6,419,717 B2 | 7/2002 | Moy et al. | |
| 6,432,320 B1 | 8/2002 | Bonsignore et al. | |
| 6,695,974 B2 | 2/2004 | Withers et al. | |
| 6,783,746 B1 | 8/2004 | Zhang et al. | |
| 6,828,282 B2 | 12/2004 | Moy et al. | |
| 6,965,513 B2 | 11/2005 | Montgomery et al. | |
| 7,258,160 B2 | 8/2007 | Hashimoto | |
| 2001/0041663 A1 * | 11/2001 | Moy et al. ................ 508/413 |
| 2002/0100578 A1 * | 8/2002 | Withers et al. ............ 165/80.4 |
| 2004/0194944 A1 | 10/2004 | Hendricks et al. | |

(Continued)

FOREIGN PATENT DOCUMENTS

WO  WO 03/106600  * 12/2003

OTHER PUBLICATIONS

Min-Sheng Liu, et al., "Enhancement of thermal conductivity with carbon nanotube for nanofluids", International Communications in Heat and Mass Transfer, No. 32, pp. 1202-1210, (2005).*

(Continued)

*Primary Examiner*—Mark Kopec  
*Assistant Examiner*—Khanh Tuan Nguyen  
(74) *Attorney, Agent, or Firm*—Gordon & Rees LLP

(57) ABSTRACT

The present invention relates to compositions of a nanofluid, which comprises a thermal transfer fluid and carbon nanoparticles. The nanofluid may be hydrophilic nanofluids, such as a coolant, or hydrophobic nanofluids, such as nanolubricants or nanogreases. In particular, the present invention provides a homogenous hydrophilic nanofluid, which contains soluble carbon nanotubes in the hydrophilic thermal transfer fluid. The present invention also provides a nanogrease, which is a sustainable dispersion of solid carbon nanotubes in a hydrophobic thermal transfer fluid. The solid carbon nanotubes function as both as a thickener to modulate viscosity and as a solid heat transfer medium to enhance thermal conductivity and high temperature resistance.

37 Claims, 10 Drawing Sheets

U.S. PATENT DOCUMENTS

| | | | |
|---|---|---|---|
| 2004/0206491 A1* | 10/2004 | Davidson et al. | 165/185 |
| 2004/0209782 A1 | 10/2004 | Zhang et al. | |
| 2004/0238799 A1* | 12/2004 | Hwang et al. | 252/511 |
| 2005/0012069 A1 | 1/2005 | Maes et al. | |
| 2005/0025694 A1 | 2/2005 | Zhang et al. | |
| 2005/0124504 A1* | 6/2005 | Zhang et al. | 508/128 |
| 2005/0244326 A1* | 11/2005 | Colbert et al. | 423/447.1 |
| 2005/0244644 A1* | 11/2005 | Hampden-Smith et al. | 428/408 |
| 2006/0083694 A1* | 4/2006 | Kodas et al. | 424/46 |
| 2007/0122335 A1* | 5/2007 | Hwang | 423/447.1 |
| 2007/0253888 A1* | 11/2007 | Liu et al. | 423/447.1 |

OTHER PUBLICATIONS

Choi, et al., "Enhancing Thermal Conductivity of Fluids with Nanoparticles," Developments and Applications of Non-Newtonian Flows, Eds. D.A. Siginer, et al., The American Society of Mechanical Engineers, New York, FED-vol. 231/MD-vol. 66, pp. 99-105 (Nov. 1995).

Lee, et al., "Application of Metallic Nanoparticle Suspensions in Advanced Cooling Systems," Recent Advances in Solids/Structures and Application of Metallic Materials, Eds. Y. Kwon, et al., The American Society of Mechanical Engineers, New York, PVP-vol. 342/MD-vol. 72, pp. 227-234 (Nov. 1996).

Wagener, et al., "Preparation of Metal Nanosuspensions by High-Pressure DC-Sputtering on Running Liquids," Mat. Res. Soc. Symp. Proc., 1997, vol. 457, pp. 149-154.

Eastman, et al., "Enhanced Thermal Conductivity through the Development of Nanofluids," Invited paper presented at Materials Research Society 1996 Fall Meeting, Boston, Dec. 2-6, 1996, also published in Proceedings of Symposium on Nanophase and Nanocomposite Materials II, Materials Research Society, Boston, 1997, vol. 457, pp. 3-11.

Lee, et al., "Measuring Thermal Conductivity of Fluids Containing Oxide Nanoparticles," ASME J. Heat Transfer, 1999, vol. 121, pp. 280-289.

Wang, et al., "Thermal Conductivity of Nanoparticle-Fluid Mixture," J. of Thermophysics and Heat Transfer, 1999, vol. 13, No. 4, pp. 474-480.

Eastman, et al., "Anomalously Increased Effective Thermal Conductivities of Ethylene Glycol-Based Nanofluids Containing Copper Nanoparticles," Applied Physics Letters, 2001, vol. 78, No. 6, pp. 718-720.

Berber, et al., "Unusually High Thermal Conductivity of Carbon Nanotubes," Physical Review Letters, 2000, vol. 84, No. 20, pp. 4613-4616.

Assael, et al., "Thermal Conductivity of Suspensions of Carbon Nanotubes in Water," International Journal of Thermophysics, 2004, vol. 25, No. 4, pp. 971-985.

Kostic, et al., "Investigation of Thermal Conductivity of a Polymer Solution as Function of Shearing Rate", 1999, International Mechanical Engineering Congress and Exposition, pp. 1-7.

Menna, et al., "Shortened Single-Walled Nanotubes Functionalized with Poly(ethylene Glycol): Preparation and Properties", ARKIVOC, 2003, vol. xiii, pp. 64-73.

Xuan, et al., "Heat Transfer Enhancement of Nanofulids", International Journal of Heat and Fluid Flow, 2000, vol. 21, pp. 58-64.

Marquis, et al., "Improving the Heat Transfer of Nanofluids and Nanolubricants with Carbon Nanotubes", J.O.M., 2005, pp. 32-43.

Keblinski, et al., "Nanofluids for Thermal Transport", Materials Today, Jun. 2005, pp. 36-44.

Xie, et al., "Nanofluids Containing Multiwalled Carbon Nanotubes and Their Enhanced Thermal Conductivities", J. Appl. Phys., 2003, vol. 94, No. 8, pp. 4967-4971.

Wen, et al., "Effective Thermal Conductivity of Aqueous Suspensions of Carbon Nanotubes (Carbon Nanotube Nanofluids)", J. Thermophys. Heat Transfer, 2004, vol. 18, pp. 481-485.

Liu, et al., "Enhancement of Thermal Conductivity with Carbon Nanotube for Nanofluids", International Communications in Heat and Mass Transfer, 2005, vol. 32, pp. 1202-1210.

Chen, et al., "Modification of Multi-walled Carbon Nanotubes with Fatty Acid and Their Tribological Properties as Lubricant Additive", Carbon, 2005, vol. 43, pp. 1660-1666.

Choi et al., "Anomalous Thermal Conductivity Enhancement in Nanotube Suspensions", Applied Physics Letters, 2001, vol. 79, No. 14, pp. 2252-2254.

Booser, in "Lubrication and Lubricants", Kirk-Othmer Encyclopedia of Chemical Technology, 1995, Fourth Ed., vol. 15, pp. 463-517.

* cited by examiner

FIGURE 3

| Sample Number | 4-1 | 4-2 | 4-3 | 4-4 | 4-5 | 4-6 | 5-7 | 7-1 | 7-2 | 7-3 | 7-4 | 7-5 |
|---|---|---|---|---|---|---|---|---|---|---|---|---|
| | | | | | | Grams | | | | | | |
| PAO, 6 cSt | 12.04 | 12.01 | 12.03 | 12.03 | | 4.45 | 12.00 | 12.04 | | | 12.00 | 12.02 |
| PAO, 40 cSt | 17.98 | 17.99 | 18.74 | 18.10 | 14.99 | 10.55 | 18.00 | 18.07 | 15.05 | 15.00 | 18.01 | 18.01 |
| Esterex NP4101 (Neopolyol Ester) | | | | | 15.03 | | | | 15.01 | 15.02 | | |
| KR-016 (Alkylated naphthalene) | | | | | | 15.00 | | | | | | |
| SWNT-CAR | 6.09 | 6.06 | | | 6.06 | 6.08 | 4.51 | | 3.76 | | 3.93 | |
| MWNT-HMSI | | | 6.06 | 6.07 | | | | 6.97 | | 7.02 | | 7.99 |
| Carbon nanotube thickener, % | 16.87 | 16.81 | 16.45 | 16.77 | 16.80 | 16.85 | 13.07 | 18.80 | 11.12 | 18.95 | 11.58 | 21.02 |
| Base Oil Blend Kinematic | | | | | | | | | | | | |
| Viscosity @ 40 C, cSt | 142 | 142 | 142 | 142 | 151 | 145 | 142 | 142 | 151 | 151 | 142 | 142 |
| Penetration, 1/4 scale, D1403 | | | | | | | | | | | | |
| Unworked, mm | 236 | 226 | 315 | 335 | 208 | 215 | 251 | 303 | 296 | 287 | 281 | 273 |
| w/60, mm | 225 | 228 | 328 | 328 | 208 | 217 | 258 | 303 | 294 | 294 | 281 | 270 |
| Dropping Point, C, D2265 | >271 | >271 | >271 | >271 | >271 | >271 | >271 | >271 | >271 | >271 | ND | ND |

Viscosity versus shear rate with 0.5% MER SWNT, 0.5% acid treat CNI ESD SWNT and 0.5% Rao MWNT in BP166

Viscosity versus shear rate with BP166, 1% CNI ESD SWNT and 1% Carbolex SWNT in BP166

CARBON NANOPARTICLE-CONTAINING NANOFLUID

CROSS REFERENCE TO RELATED APPLICATION

This is a continuation-in-part of pending prior U.S. patent application Ser. Nos. 11/332,679 and 11/332,682, both filed Jan. 12, 2006. The entire disclosures of these prior applications are considered to be part of the disclosure of this application and are hereby incorporated by reference herein.

FEDERALLY FUNDED RESEARCH

United States Army Research Laboratories, Cooperative Agreement DAAD19-02-0011. Consequently the U.S. Government may have certain rights in this invention.

TECHNICAL FIELD

The present invention relates to a composition of a nanofluid which contains nanoparticles in a thermal transfer fluid. The present invention also relates to processes for producing nanofluids with enhanced thermal conductive properties.

BACKGROUND OF THE INVENTION

Conventional heat transfer fluids such as water, mineral oil, and ethylene glycol play an important role in many industries including power generation, chemical production, air conditioning, transportation, and microelectronics. However, their inherently low thermal conductivities have hampered the development of energy-efficient heat transfer fluids that are required in a plethora of heat transfer applications. It has been demonstrated recently that the heat transfer properties of these conventional fluids can be significantly enhanced by dispersing nanometer-sized solid particle and fibers (i.e. nanoparticles) in fluids (Eastman, et al., *Appl. Phys. Lett.* 2001, 78(6), 718; Choi, et al., *Appl. Phys. Lett.* 2001, 79(14), 2252). This new type of heat transfer suspensions is known as nanofluids. Carbon nanotube-containing nanofluids provide several advantages over the conventional fluids, including thermal conductivities far above those of traditional solid/liquid suspensions, a nonlinear relationship between thermal conductivity and concentration, strongly temperature-dependent thermal conductivity, and a significant increase in critical heat flux. Each of these features is highly desirable for thermal systems and together makes nanofluids strong candidates for the next generation of heat transfer fluids.

The observed substantial increases in the thermal conductivities of nanofluids can have broad industrial applications and can also potentially generate numerous economical and environmental benefits. Enhancement in the heat transfer ability could translate into high energy efficiency, better performance, and low operating costs. The need for maintenance and repair can also be minimized by developing a nanofluid with a better wear and load-carrying capacity. Consequently, classical heat dissipating systems widely used today can become smaller and lighter, thus resulting in better fuel efficiency, less emission, and a cleaner environment.

Nanoparticles of various materials have been used to make heat transfer nanofluids, including copper, aluminum, copper oxide, alumina, titania, and carbon nanotubes (Keblinski, et al, *Material today*, 2005, 36). Of these nanoparticles, carbon nanotubes show greatest promise due to their excellent chemical stability and extraordinary thermal conductivity. Carbon nanotubes are macromolecules of the shape of a long thin cylinder and thus with a high aspect ratio. There are two main types of carbon nanotubes: single-walled nanotubes ("SWNT") and multi-walled nanotubes ("MWNT"). The structure of a single-walled carbon nanotube can be described as a single graphene sheet rolled into a seamless cylinder whose ends either open or capped by either half fullerenes or more complex structures including pentagons. Multi-walled carbon nanotubes comprise an array of such nanotubes that are concentrically nested like rings of a tree trunk with a typical distance of approximately 0.34 nm between layers.

Carbon nanotubes are the most thermal conductive material known today. Basic research over the past decade has shown that carbon nanotubes could have a thermal conductivity an order of magnitude higher than copper (3,000 W/m·K for multi-walled carbon nanotubes and 6,000 W/m·K for single-walled carbon nanotubes). Therefore, the thermal conductivities of nanofluids containing such solid particles would be expected to be significantly enhanced when compared with conventional fluids along. Experimental results have demonstrated that carbon nanotubes yield by far the highest thermal conductivity enhancement ever achieved in a fluid: a 150% increase in conductivity of oil at about 1% by volume of multi-walled carbon nanotubes (Choi, et al., *App. Phys. Lett.*, 2001, 79(14), 2252).

Several additional studies of carbon nanotube suspensions in various heat transfer fluids have since been reported. However, only moderate enhancements in thermal conductivity have been observed. Xie et al. measured a carbon nanotube suspension in an aqueous solution of organic liquids and found only 10-20% increases in thermal conductivity at 1% by volume of carbon nanotubes (Xie, et al., *J. Appl. Phys.*, 2003, 94(8):4967). Similarly, Wen and Ding found an about 25% enhancement in the conductivity at about 0.8% by volume of carbon nanotubes in water (Wen and Ding, *J. Thermophys. Heat Trans.*, 2004, 18:481). Even at these levels, carbon nanotubes still hold great promises of developing the next generation of efficient thermal transfer fluids.

Despite those extraordinary promising thermal properties exhibited by carbon nanotube suspensions, it remains to be a serious technical challenge to effectively and efficiently disperse carbon nanotubes into aqueous or organic mediums to produce a nanoparticle suspension with a sustainable stability and consistent thermal properties. Due to hydrophobic natures of graphitic structure, carbon nanotubes are not soluble in any known solvent. They also have a very high tendency to form aggregates and extended structures of linked nanoparticles, thus leading to phase separation, poor dispersion within a matrix, and poor adhesion to the host. However, stability of the nanoparticle suspension is especially essential for practical industrial applications. Otherwise, the thermal properties of a nanofluid, such as thermal conductivity, will constantly change as the solid nanoparticles gradually separate from the fluid. Unfortunately, these early studies on carbon nanotubes-containing nanofluids have primarily focused on the enhancement of thermal conductivity and very little experimental data is available regarding the stability of those nanoparticle suspensions.

Accordingly, there is a great need for the development of an effective formulation which can be used to efficiently disperse different forms of carbon nanotubes into a desired heat transfer fluid and produce a nanofluid with a sustainable stability and consistent thermal properties. Hence, the present invention provides a nanofluid composition, which comprises a conventional heat transfer fluid and carbon nanoparticles. The present invention also relates to methods for preparing a hydrophilic nanofluid, nanolubricant and nanogrease with enhanced thermal conductivities. Furthermore, the present invention provides a homogenous nanofluid which contains soluble nanoparticles.

SUMMARY OF THE INVENTION

The objective of the present invention is to provide a nanofluid composition with enhanced thermal conductive properties, which comprises conventional thermal transfer fluids and solid carbon nanoparticles such as carbon nanotubes to form a sustainable nanoparticle suspension or soluble carbon nanotubes to form a homogenous solution.

In accordance with the present invention, three processes for preparing a stable suspension of carbon nanoparticles in a thermal transfer fluid are disclosed. In one embodiment, the nanofluid is produced by dispersing dry carbon nanoparticles directly into a mixture of a thermal transfer fluid and other additives in the present of surfactants with help of a physical agitation such as ultrasonication. If ultrasonication is used, it is preferably to ultrasonicate the carbon nanoparticle-containing mixture intermittently to avoid causing structural damage to the nanoparticles, especially for carbon nanotubes.

In another embodiment, the nanofluid is produced in three steps. At first, dry carbon nanoparticles are evenly dispersed into a volatile solvent, such as an organic solvent like chloroform, with help of a physical agitation to form an intermediate dispersion. Then, a thermal transfer fluid, surfactants, and other additives are added to this intermediate nanoparticle dispersion and mixed thoroughly with help of a physical agitation. Lastly, the volatile solvent is removed to produce a uniformly dispersed nanofluid.

In yet another embodiment, the nanofluid is prepared by dispersing carbon nanoparticles at elevated temperatures. Prior to the addition of carbon nanoparticles, a homogeneous mixture of surfactants and other additives in a thermal transfer fluid is first prepared. Heating and a physical agitation, such as mechanical stirring, can also be applied to help the preparation of the mixture. The dispersion of carbon nanoparticles is then carried out at an elevated temperature range, at which no adversary reactions occur between the chemicals and carbon nanoparticles, and of which the highest temperature is below the boiling point of any chemical in the thermal transfer fluid mixture. During the dispersion process, carbon nanoparticles are added slowly in small portion with help of a physical agitation. After addition, the mixture is blended further to ensure producing a homogeneous dispersion.

The present invention also relates to compositions of nanofluids, including hydrophilic nanofluids, nanolubricants and nanogreases. In general, the nanofluid of the present invention comprises nanoparticles, such as carbon nanoparticles, and a thermal transfer fluid. In one aspect, the nanoparticles in the nanofluid are soluble in the thermal transfer fluid. In another aspect, the nanoparticles are insoluble solid particles dispersed in the thermal transfer fluid. In yet another aspect, the nanofluid is essentially free of a surfactant. In still another aspect, the nanofluid may also comprise one or more surfactants for stabilizing the insoluble carbon nanoparticle dispersion. Additionally, the nanofluid may further comprise chemical additives to provide other desired chemical and physical characteristics, such as antiwear, corrosion protection and thermal oxidative properties.

In one embodiment, the nanofluid is a homogenous hydrophilic nanofluid, which comprises a hydrophilic thermal transfer fluid and carbon nanoparticles. The carbon nanoparticles are functionalized carbon nanoparticles soluble in the hydrophilic thermal transfer fluid. In one aspect, the homogenous nanofluid is essentially free of a surfactant. In another aspect, the homogeneous nanofluid may further comprise other chemical additives, such as a surfactant, to enhance the characteristics of the nanofluid. The homogenous hydrophilic nanofluid is a Newtonian fluid.

In another embodiment, the hydrophilic nanofluid is carbon nanotube dispersion which comprises a hydrophilic thermal transfer fluid and carbon nanoparticles. The hydrophilic nanofluid further comprises one or more surfactants to assist the dispersion of solid nanoparticles and the stability of the resulted nanoparticle dispersion. When a hydrophilic nanofluid is a dispersion of solid carbon nanoparticles in a hydrophilic thermal transfer fluid, the nanofluid may be a Newtonian or non-Newtonian fluid.

In yet another embodiment, the nanofluid is a hydrophobic nanofluid, which comprises a hydrophobic thermal transfer fluid and carbon nanoparticles. In one aspect, the carbon nanoparticles are soluble in the hydrophobic thermal transfer fluid. The hydrophobic nanofluid that contains soluble carbon nanoparticles is a homogeneous solution. The homogenous nanofluid may be essentially free of a surfactant. The homogeneous nanofluid may also comprise other chemical additives, such as surfactants, to enhance the characteristics of the nanofluid.

In another aspect, the carbon nanoparticles are insoluble solid nanoparticles. The hydrophobic nanofluid that contains insoluble solid nanoparticles is a dispersion of solid carbon nanoparticles in the hydrophobic thermal transfer fluid. The hydrophobic nanofluid further comprises one or more surfactants to help the dispersion of solid nanoparticles and the stability of the resulted nanoparticle dispersion. The hydrophobic nanofluid may also contain other chemical additives. A dispersion of solid carbon nanoparticles in a hydrophobic thermal transfer fluid may be a Newtonian or non-Newtonian fluid.

In yet another embodiment, the nanofluid is a hydrophobic non-Newtonian nanofluid, which comprises solid carbon nanoparticles in a hydrophobic thermal transfer fluid. The carbon nanoparticles function both as a thickening agent to modulate viscosity and as a solid heat transfer medium to enhance thermal conductivity. In one aspect, the non-Newtonian nanofluid is essentially free of a surfactant. In another aspect, the non-Newtonian nanofluid may also contain chemical additives, such as a surfactant. The non-Newtonian nanofluid is prepared by dispersing evenly solid carbon nanoparticles into a thermal transfer fluid with the help of physical agitation. A specific example of the non-Newtonian nanofluid is a nanogrease.

BRIEF DESCRIPTION OF THE DRAWINGS

FIG. 3 shows the effect of carbon nanotubes on grease structure development.

DETAILED DESCRIPTION OF THE INVENTION

Figure 1:
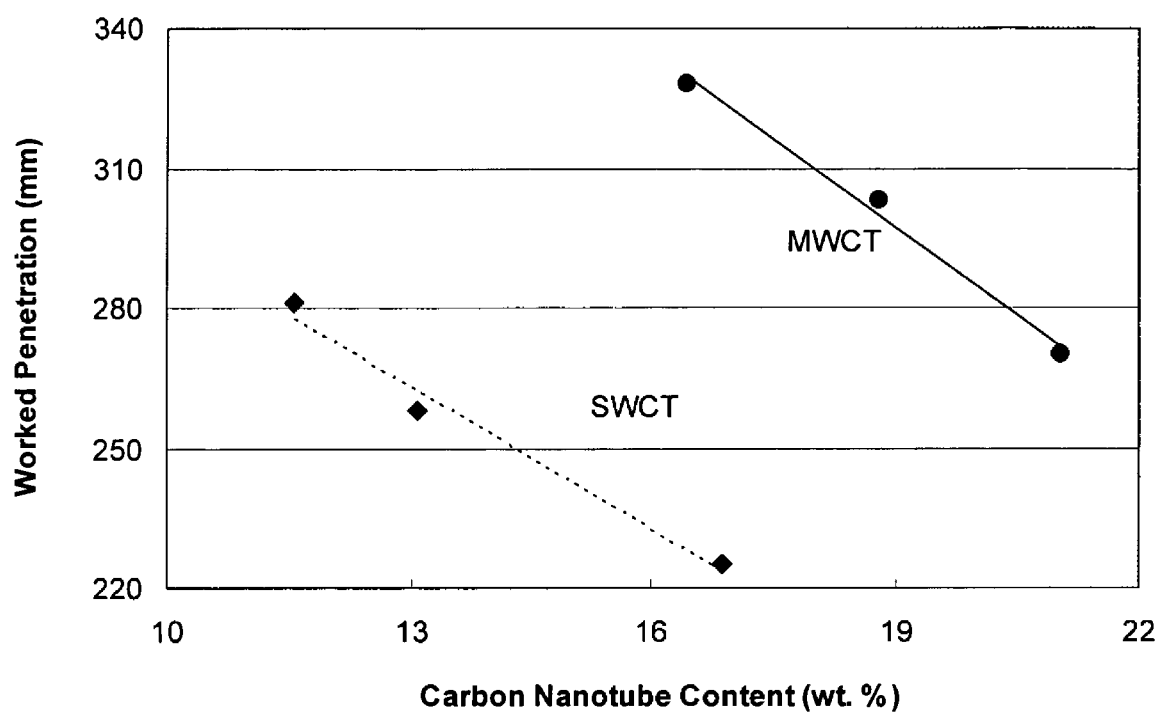
FIG. 1 shows the thickening power of carbon nanotubes in PAO.

The present invention relates to compositions of nanofluids, including hydrophilic nanofluids, nanolubricants and nanogreases. In general, the nanofluid of the present invention comprises nanoparticles, such as carbon nanoparticles, and a thermal transfer fluid. The nanofluid may also comprise one or more surfactants for stabilizing the carbon nanoparticle dispersion. Additionally, the nanofluid may further comprise chemical additives to provide other desired chemical and physical characteristics, such as antiwear, corrosion protection and thermal oxidative properties.

As used in this disclosure, the singular forms "a", "an", and "the" may refer to plural articles unless specifically stated otherwise. To facilitate understanding of the invention set forth in the disclosure that follows, a number of terms are defined below.

DEFINITIONS

The term "carbon nanotube" refers to a class of macromolecules which have a shape of a long thin cylinder.

The term "aspect ratio" refers to a ratio of the length over the diameter of a particle.

The term "SWNT" refers to a single-walled carbon nanotube.

The term "MWNT" refers to a multi-walled carbon nanotube.

The term "D-SWNT" refers to a double-walled carbon nanotube.

The term "F-SWNT" refers to a fluorinated SWNT.

The term "carbon nanoparticle" refers to a nanoparticle which contain primarily carbon element, including diamond, graphite, fullerenes, carbon nanotubes, carbon fibers, and combinations thereof.

The term "PAO" refers to polyalphaolefin.

The term "Polyol ester" refers to an ester of an organic compound containing at least two hydroxyls with at least one carboxylic acid.

The term "surfactant" refers to a molecule having surface activity, including wetting agents, dispersants, emulsifiers, detergents, and foaming agents, etc.

The term "Newtonian fluid" refers to a fluid whose shear stress is linearly proportional to the velocity gradient in the direction perpendicular to the plane of shear.

The term "non-Newtonian fluid" refers to a fluid whose viscosity changes with the applied strain rate.

Carbon Nanoparticles:

Carbon nanoparticles have a high heat transfer coefficient and high thermal conductivity, which often exceed these of the best metallic material. Many forms of carbon nanoparticles can be used in the present invention, including carbon nanotubes, diamond, fullerenes, graphite, carbon fibers, and combinations thereof.

Carbon nanotubes ("CNT") are macromolecules in the shape of a long thin cylinder often with a diameter in few nanometers. The basic structural element in a carbon nanotube is a hexagon which is the same as that found in graphite. Based on the orientation of the tube axis with respect to the hexagonal lattice, a carbon nanotube can have three different configurations: armchair, zigzag, and chiral (also known as spiral). In armchair configuration, the tube axis is perpendicular to two of six carbon-carbon bonds of the hexagonal lattice. In zigzag configuration, the tube axis is parallel to two of six carbon-carbon bonds of the hexagonal lattice. Both these two configurations are achiral. In chiral configuration, the tube axis forms an angle other than 90 or 180 degrees with any of six carbon-carbon bonds of the hexagonal lattice. Nanotubes of these configurations often exhibit different physical and chemical properties. For example, an armchair nanotube is always metallic whereas a zigzag nanotube can be metallic or semiconductive depending on the diameter of the nanotube. All three different nanotubes are expected to be very good thermal conductors along the tube axis, exhibiting a property known as "ballistic conduction," but good insulators laterally to the tube axis.

In addition to the common hexagonal structure, the cylinder of a carbon nanotube molecule can also contain other size rings, such as pentagon and heptagon. Replacement of some regular hexagons with pentagons and/or heptagons can cause cylinders to bend, twist, or change diameter, and thus lead to some interesting structures such as "Y—," "T-," and "X-junctions," and different chemical activities. Those various structural variations and configurations can be found in both SWNT and MWNT. However, the present invention is not limited by any particular configuration and structural variation. The carbon nanotube used in the present invention can be in the configuration of armchair, zigzag, chiral, or combinations thereof. The nanotube can also contain structural elements other than hexagon, such as pentagon, heptagon, octagon, or combinations thereof.

Another structural variation for MWNT molecules is the arrangement of the multiple tubes. A perfect MWNT is like a stack of graphene sheets rolled up into concentric cylinders with each wall parallel to the central axis. However, the tubes can also be arranged so that an angle between the graphite basal planes and the tube axis is formed. Such MWNT is known as a stacked cone, Chevron, bamboo, ice cream cone, or piled cone structures. A stacked cone MWNT can reach a diameter of about 100 nm. In spite of these structural variations, all MWNTs are suitable for the present invention as long as they have an excellent thermal conductivity. The term MWNT used herein also includes double-walled nanotubes ("DWNT").

Carbon nanotubes used in the present invention can also encapsulate other elements and/or molecules within their enclosed tubular structures. Such elements include Si, Ti, V, Cr, Mn, Fe, Co, Ni, Cu, Y, Zr, Mo, Ta, Au, Th, La, Ce, Pr, Nb, Gd, Tb, Dy, Ho, Er, Tm, Yb, Lu, Mo, Pd, Sn, and W. Such molecules include alloys of these elements such as alloys of Cobalt with S, Br, Pb, Pt, Y, Cu, B, and Mg, and compounds such as the carbides (i.e. TiC, MoC, etc.) The present of these elements, alloys and compounds within the core structure of fullerenes and nanotubes can enhance the thermal conductivity of these nanoparticles which then translates to a higher thermal conductive nanofluid when these nanoparticles are suspend in a heat transfer fluid.

Carbon nanoparticles used in the present invention can also be chemically modified and functionalized, such as covalently attached hydrophilic groups to increase their solubility in hydrophilic fluids or lipophilic chains to increase their solubility in hydrophobic oils. Covalent functionalization of carbon nanoparticles, especially carbon nanotubes and fullerenes, has commonly been accomplished by three different approaches, namely, thermally activated chemistry, electrochemical modification, and photochemical functionalization. The most common methods of thermally activated chemical functionalization are addition reactions on the sidewalls. For example, the extensive treatment of a nanotube with concentrated nitric and sulfuric acids leads to the oxidative opening of the tube caps as well as the formation of holes in the sidewalls and thus produces a nanotube decorated with carboxyl groups, which can be further modified through the creation of amide and ester bonds to generate a vast variety of functional groups. The nanotube molecule can also be modified through addition reactions with various chemical reagents such halogens and ozone. Unlike thermally controlled modification, electrochemical modification of nanotubes can be carried out in more selective and controlled manner. Interestingly, a SWNT can be selectively modified or functionalized either on the cylinder sidewall or the optional end caps. These two distinct structural moieties often display different chemical and physical characteristics. The functional groups on functionalized carbon nanoparticles may be attached directly to the carbon atoms of a carbon nanoparticle or via chemical linkers, such as alkylene or arylene groups. To increase hydrophilicity, carbon nanoparticles can be functionalized with one or more hydrophilic functional groups, such as, sulfonate, carboxyl, hydroxyl, amino, amide, urea, carbamate, urethane, and phosphate. To increase hydrophobicity, carbon nanoparticles may be functionalized with one or more hydrophobic alkyl or aryl groups. The functionalized carbon particle may have no less than about 2, no less than about 5, no less than about 10, no less than about 20, or no less than about 50 functional groups on average.

The term "carbon nanotube" used herein refers to all structural variations and modification of SWNT and MWNT discussed hereinabove, including configurations, structural defects and variations, tube arrangements, chemical modification and functionalization, and encapsulation.

Carbon nanotubes are commercially available from a variety of sources. Single-walled carbon nanotubes can be obtained from Carbolex (Broomall, Pa.), MER Corporation (Tucson, Ariz.), and Carbon Nanotechnologies Incorporation ("CNI", Houston, Tex.). Multi-walled carbon nanotubes can be obtained from MER Corporation (Tucson, Ariz.) and Helix material solution (Richardson, Tex.). However, the present invention is not limited by the source of carbon nanotubes. In addition, many publications are available with sufficient information to allow one to manufacture nanotubes with desired structures and properties. The most common techniques are arc discharge, laser ablation, chemical vapor deposition, and flame synthesis. In general, the chemical vapor deposition has shown the most promise in being able to produce larger quantities of nanotubes at lower cost. This is usually done by reacting a carbon-containing gas, such as acetylene, ethylene, ethanol, etc., with a metal catalyst particle, such as cobalt, nickel, or ion, at temperatures above 600° C.

The selection of a particular carbon nanoparticle depends on a number of factors. The most important one is that the nanoparticle has to be compatible with an already existing base fluid (a thermal transfer fluid) discussed thereafter. Other factors include heat transfer properties, cost effectiveness, solubility, dispersion and settling characteristics. In one embodiment of the present invention, the carbon nanoparticles selected contain predominantly single-walled nanotubes. In another embodiment, the carbon nanoparticles selected contain predominantly multi-walled nanotubes. In yet another embodiment, the carbon nanoparticles are functionalized chemically. The functionalized carbon nanoparticles may be soluble in a hydrophilic thermal transfer fluid, which are suitable for preparing a hydrophilic nanofluid, or in a hydrophobic thermal transfer fluid, which are suitable for preparing a hydrophobic nanofluid.

In one aspect, the carbon nanotube has a carbon content of no less than about 60%, no less than about 80%, no less than about 90%, no less than about 95%, no less than about 98%, or no less than about 99%. In another aspect, the carbon nanotube has a diameter of from about 0.2 to about 100 nm, from about 0.4 to about 80 nm, from about 0.5 to about 60 nm, or from about 0.5 to about 50 nm. In yet another aspect, the carbon nanotube is no greater than about 200 micrometers, no greater than 100 micrometers, no greater than about 50 micrometers, or no greater than 20 micrometers in length. In yet another aspect, the carbon nanotube has an aspect ratio of no greater than 1,000,000, no greater than 100,000, no greater than 10,000, no greater than 1,000, no greater than about 500, no greater than about 200, or no greater than about 100. In yet another aspect, the carbon nanotube has a thermal conductivity of no less than 10 W/m·K, no less than 100 W/m·K, no less than 500 W/m·K, or no less than 1,000 W/m·K. In still another aspect, the soluble nanotube has a solubility of no less than 0.01 g/L, no less than 0.05 g/L, no less than 0.1 g/L, no less than 0.5 g/L, no less than 1 g/L, no less than 2 g/L, no less than 5 g/L, or no less than 10 g/L in a desired thermal transfer fluid, either hydrophilic or hydrophobic.

In yet another embodiment, the carbon particles are diamond nanoparticles, graphite nanoparticles, fullerenes, or carbon fibers. In yet another embodiment, the carbon particles are a combination of two or more selected from diamond nanoparticles, graphite nanoparticles, fullerenes, carbon fibers, and carbon nanotubes. A combination can be a mixture of two or more nanoparticles of the same type or of different types. For examples, a combination of two nanoparticles can be a mixture of SWNT and MWNT, a mixture of two SWNTs with different properties and/or manufactory methods, a mixture of two MWNT with different properties and/or manufactory methods, a mixture of carbon nanotubes with graphite nanoparticles, a mixture of carbon nanotubes with diamond particles, and a mixture of carbon nanotubes with fullerenes.

Thermal Transfer Fluid:

In the present invention, the major component of the nanofluid is a thermal transfer fluid, which is either hydrophilic or hydrophobic. A hydrophilic thermal transfer fluid is commonly used in coolants whereas a hydrophobic thermal transfer fluid is commonly used in a lubricant or grease.

1. Hydrophilic Thermal Transfer Fluid

The hydrophilic thermal transfer fluid of the present invention includes a hydrophilic liquid that are miscible with water, including water, aliphatic alcohols, alkylene glycols, di(alkylene) glycols, monoalkyl ethers of alkylene glycols or di(alkylene) glycols, and various mixtures thereof. Suitable aliphatic alcohols contain no greater than 6 carbons and no greater than 4 hydroxyls, such as methanol, ethanol, isopropanol, and glycerol. Suitable alkylene glycols contain no greater than 5 carbons, such as ethylene glycol, propylene glycol, and 1,2-butylene glycol. Particularly, the hydrophilic thermal transfer fluid comprises ethylene glycol, propylene glycol, and mixtures thereof. Ethylene glycol and propylene glycol are excellent antifreeze agents and also markedly reduce the freezing point of water. Suitable di(alkylene) glycols contain no greater than 10 carbons, such as diethylene glycol, triethylene glycol, tetraethylene glycol, and dipropylene glycol. Commercial antifreeze coolants often contain more than one glycol compounds. For example, Prestone antifreeze coolant contains 95 to 100% of ethylene glycol and no greater than 5% of diethylene glycol. The mixture as used herein refers to a combination of two or more hydrophilic liquids. As used herein, the term "alkylene glycol" refers to a molecule having glycol functional moiety in its structure in general, including alkylene glycol, alkylene glycols, di(alkylene) glycols, tri(alkylene) glycols, tetra(alkylene) glycols, and their various derivatives, such as ethers and carboxylic esters.

2. Hydrophobic Thermal Transfer Fluid

The hydrophobic thermal transfer fluid used in the present invention may be selected from a wide variety of well-known organic oils (also known as base oils), including petroleum distillates, synthetic petroleum oils, greases, gels, oil-soluble polymer composition, vegetable oils, and combinations thereof. Petroleum distillates, also known as mineral oils, generally include paraffins, naphthenes and aromatics.

Synthetic petroleum oils are the major class of lubricants widely used in various industries. Some examples include alkylaryls such as dodecylbenzenes, tetradecylbenzenes, dinonylbenzenes, and di-(2-ethylhexyl)benzenes; polyphenyls such as biphenyls, terphenyls, and alkylated polyphenyls; fluorocarbons such as polychlorotrifluoroethylenes and copolymers of perfluoroethylene and perfluoropropylene; polymerized olefins such as polybutylenes, polypropylenes, propylene-isobutylene copolymers, chlorinated polybutylenes, poly(1-octenes), and poly(1-decenes); organic phosphates such as triaryl or trialkyl phosphates, tricresyl phosphate, trioctyl phosphate, and diethyl ester of decylphosphonic acid; and silicates such as tetra(2-ethylhexyl)silicate, tetra(2-ethylbutyl)silicate, and hexa(2-ethylbutoxy)disiloxane. Other examples include polyol esters, polyglycols, polyphenyl ethers, polymeric tetrahydrofurans, and silicones.

In one embodiment of the present invention, the hydrophobic thermal transfer fluid is a diester which is formed through the condensation of a dicarboxylic acid, such as adipic acid, azelaic acid, fumaric acid, maleic acid, phtalic acid, sebacic acid, suberic acid, and succinic acid, with a variety of alcohols with both straight, cyclic, and branched chains, such as butyl alcohol, dodecyl alcohol, ethylene glycol diethylene glycol monoether, 2-ethylhexyl alcohol, isodecyl alcohol, hexyl alcohol, pentaetheritol, propylene glycol, tridecyl alcohol, and trimethylolpropane. Modified dicarboxylic acids, such as alkenyl malonic acids, alkyl succinic acids, and alkenyl succinic acids, can also be used. Specific examples of these esters include dibutyl adipate, diisodecyl azelate, diisooctyl azelate, di-hexyl fumarate, dioctyl phthalate, didecyl phthalate, di(2-ethylhexyl)sebacate, dioctyl sebacate, dicicosyl sebacate, and the 2-ethylhexyl diester of linoleic acid dimer, the complex ester formed by reacting one mole of sebacic acid with two moles of tetraethylene glycol and two moles of 2-ethylhexanoic acid.

In another embodiment, the hydrophobic thermal transfer fluid is a polyalphaolefin which is formed through oligomerization of 1-olefines containing 2 to 32 carbon atoms, or mixtures of such olefins. Some common alphaolefins are 1-octene, 1-decene, and 1-dodecene. Examples of polyalphaolefins include poly-1-octene, poly-1-decene, poly-1-dodecene, mixtures thereof, and mixed olefin-derived polyolefins. Polyalphaolefins are commercially available from various sources, including DURASYN® 162, 164, 166, 168, and 174 (BP-Amoco Chemicals, Naperville, Ill.), which have viscosities of 6, 18, 32, 45, and 460 centistokes, respectively.

In yet another embodiment, the hydrophobic thermal transfer fluid is a polyol ester which is formed through the condensation of a monocarboxylic acid containing 5 to 12 carbons and a polyol and a polyol ether such as neopentyl glycol, trimethylolpropane, pentaerythritol, dipentaerythritol, and tripentaerythritol. Examples of commercially available polyol esters are ROYCO® 500, ROYCO® 555, and ROYCO® 808. ROYCO® 500 contains about 95% of pentaerythritol esters of saturated straight fatty acids with 5 to 10 carbons, about 2% of tricresyl phosphate, about 2% of N-phenyl-alpha-naphthylamine, and about 1% of other minor additives. ROYCO® 808 are about 30 to 40% by weight of trimethylolpropane esters of heptanoic, caprylic and capric acids, 20 to 40% by weight of trimethylolpropane esters of valeric and heptanoic acids, about 30 to 40% by weight of neopentyl glycol esters of fatty acids, and other minor additives. Generally, polyol esters have good oxidation and hydrolytic stability. The polyol ester for use herein preferably has a pour point of about −100° C. or lower to −40° C. and a viscosity of about 2 to 100 centistoke at 100° C.

In yet another embodiment, the hydrophobic thermal transfer fluid is a polyglycol which is an alkylene oxide polymer or copolymer. The terminal hydroxyl groups of a polyglycol can be further modified by esterification or etherification to generate another class of known synthetic oils. Interestingly, mixtures of propylene and ethylene oxides in the polymerization process will produce a water soluble lubricant oil. Liquid or oil type polyglycols have lower viscosities and molecular weights of about 400, whereas 3,000 molecular weight polyglycols are viscous polymers at room temperature.

In yet another embodiment, the hydrophobic thermal transfer fluid is a combination of two or more selected from the group consisting of petroleum distillates, synthetic petroleum oils, greases, gels, oil-soluble polymer composition, and vegetable oils. Suitable examples include, but not limited to, a mixture of two polyalphaolefins, a mixture of two polyol esters, a mixture of one polyalphaolefine and one polyol ester, a mixture of three polyalphaolefins, a mixture of two polyalphaolefins and one polyol ester, a mixture of one polyalphaolefin and two polyol esters, and a mixture of three polyol esters. In all the embodiments, the thermal transfer fluid preferably has a viscosity of from about 1 to about 1,000 centistokes, more preferably from about 2 to about 800 centistokes, and most preferably from about 5 to about 500 centistokes.

In yet another embodiment, the hydrophobic thermal transfer fluid is grease which is made by combining a petroleum or synthetic lubricating fluid with a thickening agent. The thickeners are generally silica gel and fatty acid soaps of lithium, calcium, strontium, sodium, aluminum, and barium. The grease formulation may also include coated clays, such as bentonite and hectorite clays coated with quaternary ammonium compounds. Sometimes carbon black is added as a thickener to enhance high-temperature properties of petroleum and synthetic lubricant greases. The addition of organic pigments and powders which include arylurea compounds indanthrene, ureides, and phthalocyanines provide high temperature stability. Sometimes, solid powders such as graphite, molybdenum disulfide, asbestos, talc, and zinc oxide are also added to provide boundary lubrication. Formulating the foregoing synthetic lubricant oils with thickeners provides specialty greases. The synthetic lubricant oils include, without limitation, diesters, polyalphaolefins, polyol esters, polyglycols, silicone-diester, and silicone lubricants. Nonmelting thickeners are especially preferred such as copper phthalocyanine, arylureas, indanthrene, and organic surfactant coated clays.

Surfactant:

A variety of surfactants can be used in the present invention as a dispersant to facilitate uniform dispersion of nanoparticles and to enhance stabilization of such dispersion as well. Typically, the surfactants used in the present invention contain an lipophilic hydrocarbon group and a polar functional hydrophilic group. The polar functional group can be of the class of carboxylate, ester, amine, amide, imide, hydroxyl, ether, nitrile, phosphate, sulfate, or sulfonate. The surfactant can be anionic, cationic, nonionic, zwitterionic, amphoteric and ampholytic.

In one embodiment, the surfactant is anionic, including sulfonates such as alkyl sulfonates, alkylbenzene sulfonates, alpha olefin sulfonates, paraffin sulfonates, and alkyl ester sulfonates; sulfates such as alkyl sulfates, alkyl alkoxy sulfates, and alkyl alkoxylated sulfates; phosphates such as monoalkyl phosphates and dialkyl phosphates; phosphonates; carboxylates such as fatty acids, alkyl alkoxy carboxylates, sarcosinates, isethionates, and taurates. Specific examples of carboxylates are sodium cocoyl isethionate, sodium methyl oleoyl taurate, sodium laureth carboxylate, sodium trideceth carboxylate, sodium lauryl sarcosinate, lauroyl sarcosine, and cocoyl sarcosinate. Specific examples of sulfates include sodium dodecyl sulfate, sodium lauryl sulfate, sodium laureth sulfate, sodium trideceth sulfate, sodium tridecyl sulfate, sodium cocyl sulfate, and lauric monoglyceride sodium sulfate.

Suitable sulfonate surfactants include alkyl sulfonates, aryl sulfonates, monoalkyl and dialkyl sulfosuccinates, and monoalkyl and dialkyl sulfosuccinamates. Each alkyl group independently contains about two to twenty carbons and can also be ethoxylated with up to about 8 units, preferably up to about 6 units, on average, e.g., 2, 3, or 4 units, of ethylene oxide, per each alkyl group. Illustrative examples of alky and aryl sulfonates are sodium tridecyl benzene sulfonate and sodium dodecylbenzene sulfonate.

Illustrative examples of sulfosuccinates include, but not limited to, dimethicone copolyol sulfosuccinate, diamyl sulfosuccinate, dicapryl sulfosuccinate, dicyclohexyl sulfosuccinate, diheptyl sulfosuccinate, dihexyl sulfosuccinate, diisobutyl sulfosuccinate, dioctyl sulfosuccinate, C12-15 pareth sulfosuccinate, cetearyl sulfosuccinate, cocopolyglucose sulfosuccinate, cocoyl butyl gluceth-10 sulfosuccinate, deceth-5 sulfosuccinate, deceth-6 sulfosuccinate, dihydroxyethyl sulfosuccinylundecylenate, hydrogenated cottonseed glyceride sulfosuccinate, isodecyl sulfosuccinate, isostearyl sulfosuccinate, laneth-5 sulfosuccinate, laureth sulfosuccinate, laureth-12 sulfosuccinate, laureth-6 sulfosuccinate, laureth-9 sulfosuccinate, lauryl sulfosuccinate, nonoxynol-10 sulfosuccinate, oleth-3 sulfosuccinate, oleyl sulfosuccinate, PEG-10 laurylcitrate sulfosuccinate, sitosereth-14 sulfosuccinate, stearyl sulfosuccinate, tallow, tridecyl sulfosuccinate, ditridecyl sulfosuccinate, bisglycol ricinosulfosuccinate, di(1,3-di-methylbutyl)sulfosuccinate, and silicone copolyol sulfosuccinates. The structures of silicone copolyol sulfosuccinates are set forth in U.S. Pat. Nos. 4,717,498 and 4,849,127.

Illustrative examples of sulfosuccinamates include, but not limited to, lauramido-MEA sulfosuccinate, oleamido PEG-2 sulfosuccinate, cocamido MIPA-sulfosuccinate, cocamido PEG-3 sulfosuccinate, isostearamido MEA-sulfosuccinate, isostearamido MIPA-sulfosuccinate, lauramido MEA-sulfosuccinate, lauramido PEG-2 sulfosuccinate, lauramido PEG-5 sulfosuccinate, myristamido MEA-sulfosuccinate, oleamido MEA-sulfosuccinate, oleamido PIPA-sulfosuccinate, oleamido PEG-2 sulfosuccinate, palmitamido PEG-2 sulfosuccinate, palmitoleamido PEG-2 sulfosuccinate, PEG-4 cocamido MIPA-sulfosuccinate, ricinoleamido MEA-sulfosuccinate, stearamido MEA-sulfosuccinate, stearyl sulfosuccinamate, tallamido MEA-sulfosuccinate, tallow sulfosuccinamate, tallowamido MEA-sulfosuccinate, undecylenamido MEA-sulfosuccinate, undecylenamido PEG-2 sulfosuccinate, wheat germamido MEA-sulfosuccinate, and wheat germamido PEG-2 sulfosuccinate.

Some examples of commercial sulfonates are AEROSOL® OT-S, AEROSOL® OT-MSO, AEROSOL® TR70% (Cytec inc, West Paterson, N.J.), NaSul CA-HT3 (King industries, Norwalk, Conn.), and C500 (Crompton Co, West Hill, Ontario, Canada). AEROSOL® OT-S is sodium dioctyl sulfosuccinate in petroleum distillate. AEROSOL® OT-MSO also contains sodium dioctyl sulfosuccinate. AEROSOL® TR70% is sodium bistridecyl sulfosuccinate in mixture of ethanol and water. NaSul CA-HT3 is calcium dinonylnaphthalene sulfonate/carboxylate complex. C500 is an oil soluble calcium sulfonate.

For an anionic surfactant, the counter ion is typically sodium but may alternatively be potassium, lithium, calcium, magnesium, ammonium, amines (primary, secondary, tertiary or quandary) or other organic bases. Exemplary amines include isopropylamine, ethanolamine, diethanolamine, and triethanolamine. Mixtures of the above cations may also be used.

In another embodiment, the surfactant is cationic, including primarily organic amines, primary, secondary, tertiary or quaternary. For a cationic surfactant, the counter ion can be chloride, bromide, methosulfate, ethosulfate, lactate, saccharinate, acetate and phosphate. Examples of cationic amines include polyethoxylated oleyl/stearyl amine, ethoxylated tallow amine, cocoalkylamine, oleylamine, and tallow alkyl amine.

Examples of quaternary amines with a single long alkyl group are cetyl trimethyl ammonium bromide ("CETAB"), dodecyltrimethylammonium bromide, myristyl trimethyl ammonium bromide, stearyl dimethyl benzyl ammonium chloride, oleyl dimethyl benzyl ammonium chloride, lauryl trimethyl ammonium methosulfate (also known as cocotrimonium methosulfate), cetyl-dimethyl hydroxyethyl ammonium dihydrogen phosphate, bassuamidopropylkonium chloride, cocotrimonium chloride, distearyldimonium chloride, wheat germ-amidopropalkonium chloride, stearyl octyidimonium methosulfate, isostearaminopropal-konium chloride, dihydroxypropyl PEG-5 linoleammonium chloride, PEG-2 stearmonium chloride, behentrimonium chloride, dicetyl dimonium chloride, tallow trimonium chloride and behenamidopropyl ethyl dimonium ethosulfate.

Examples of quaternary amines with two long alkyl groups are distearyldimonium chloride, dicetyl dimonium chloride, stearyl octyldimonium methosulfate, dihydrogenated palmoylethyl hydroxyethylmonium methosulfate, dipalmitoylethyl hydroxyethylmonium methosulfate, dioleoylethyl hydroxyethylmonium methosulfate, and hydroxypropyl bis-stearyldimonium chloride.

Quaternary ammonium compounds of imidazoline derivatives include, for example, isostearyl benzylimidonium chloride, cocoyl benzyl hydroxyethyl imidazolinium chloride, cocoyl hydroxyethylimidazolinium PG-chloride phosphate, and stearyl hydroxyethylimidonium chloride. Other heterocyclic quaternary ammonium compounds, such as dodecylpyridinium chloride, can also be used.

In yet another embodiment, the surfactant is nonionic, including polyalkylene oxide carboxylic acid esters, fatty acid esters, fatty alcohols, ethoxylated fatty alcohols, poloxamers, alkanolamides, alkoxylated alkanolamides, polyethylene glycol monoalkyl ether, and alkyl polysaccharides. Polyalkylene oxide carboxylic acid esters have one or two carboxylic ester moieties each with about 8 to 20 carbons and a polyalkylene oxide moiety containing about 5 to 200 alkylene oxide units. A ethoxylated fatty alcohol contains an ethylene oxide moiety containing about 5 to 150 ethylene oxide units and a fatty alcohol moiety with about 6 to about 30 carbons. The fatty alcohol moiety can be cyclic, straight, or branched, and saturated or unsaturated. Some examples of ethoxylated fatty alcohols include ethylene glycol ethers of oleth alcohol, steareth alcohol, lauryl alcohol and isocetyl alcohol. Poloxamers are ethylene oxide and propylene oxide block copolymers, having from about 15 to about 100 moles of ethylene oxide. Alkyl polysaccharide ("APS") surfactants (e.g. alkyl polyglycosides) contain a hydrophobic group with about 6 to about 30 carbons and a polysaccharide (e.g., polyglycoside) as the hydrophilic group. An example of commercial nonionic surfactant is FOA-5 (Octel Starreon LLC., Littleton, Colo.).

Specific examples of suitable nonionic surfactants include alkanolamides such as cocamide diethanolamide ("DEA"), cocamide monoethanolamide ("MEA"), cocamide monoisopropanolamide ("MIPA"), PEG-5 cocamide MEA, lauramide DEA, and lauramide MEA; alkyl amine oxides such as lauramine oxide, cocamine oxide, cocamidopropylamine oxide, and lauramidopropylamine oxide; sorbitan laurate, sorbitan distearate, fatty acids or fatty acid esters such as lauric acid, isostearic acid, and PEG-150 distearate; fatty alcohols or ethoxylated fatty alcohols such as lauryl alcohol, alkylpolyglucosides such as decyl glucoside, lauryl glucoside, and coco glucoside.

In yet another embodiment, the surfactant is zwitterionic, which has both a formal positive and negative charge on the same molecule. The positive charge group can be quaternary ammonium, phosphonium, or sulfonium, whereas the negative charge group can be carboxylate, sulfonate, sulfate, phosphate or phosphonate. Similar to other classes of surfactants, the hydrophobic moiety may contain one or more long, straight, cyclic, or branched, aliphatic chains of about 8 to 18 carbon atoms. Specific examples of zwitterionic surfactants include alkyl betaines such as cocodimethyl carboxymethyl betaine, lauryl dimethyl carboxymethyl betaine, lauryl dimethyl alpha-carboxyethyl betaine, cetyl dimethyl carboxymethyl betaine, lauryl bis-(2-hydroxyethyl)carboxy methyl betaine, stearyl bis-(2-hydroxypropyl)carboxymethyl betaine, oleyl dimethyl gamma-carboxypropyl betaine, and lauryl bis-(2-hydroxypropyl)alphacarboxy-ethyl betaine, amidopropyl betaines; and alkyl sultaines such as cocodimethyl sulfopropyl betaine, stearyidimethyl sulfopropyl betaine, lauryl dimethyl sulfoethyl betaine, lauryl bis-(2-hydroxyethyl)sulfopropyl betaine, and alkylamidopropylhydroxy sultaines.

In yet another embodiment, the surfactant is amphoteric. Suitable examples of suitable amphoteric surfactants include ammonium or substituted ammonium salts of alkyl amphocarboxy glycinates and alkyl amphocarboxypropionates, alkyl amphodipropionates, alkyl amphodiacetates, alkyl amphoglycinates, and alkyl amphopropionates, as well as alkyl iminopropionates, alkyl iminodipropionates, and alkyl amphopropylsulfonates. Specific examples are cocoamphoacetate, cocoamphopropionate, cocoamphodiacetate, lauroamphoacetate, lauroamphodiacetate, lauroamphodipropionate, lauroamphodiacetate, cocoamphopropyl sulfonate, caproamphodiacetate, caproamphoacetate, caproamphodipropionate, and stearoamphoacetate.

In yet another embodiment, the surfactant is a polymer such as N-substituted polyisobutenyl succinimides and succinates, alkyl methacrylate vinyl pyrrolidinone copolymers, alkyl methacrylate-dialkylaminoethyl methacrylate copolymers, alkylmethacrylate polyethylene glycol methacrylate copolymers, and polystearamides.

In yet another embodiment, the surfactant is an oil-based dispersant, which includes alkylsuccinimide, succinate esters, high molecular weight amines, and Mannich base and phosphoric acid derivatives. Some specific examples are polyisobutenyl succinimide-polyethylenepolyamine, polyisobutenyl succinic ester, polyisobutenyl hydroxybenzyl-polyethylenepolyamine, and bis-hydroxypropyl phosphorate.

In yet another embodiment, the surfactant used in the present invention is a combination of two or more selected from the group consisting of anionic, cationic, nonionic, zwitterionic, amphoteric, and ampholytic surfactants. Suitable examples of a combination of two or more surfactants of the same type include, but not limited to, a mixture of two anionic surfactants, a mixture of three anionic surfactants, a mixture of four anionic surfactants, a mixture of two cationic surfactants, a mixture of three cationic surfactants, a mixture of four cationic surfactants, a mixture of two nonionic surfactants, a mixture of three nonionic surfactants, a mixture of four nonionic surfactants, a mixture of two zwitterionic surfactants, a mixture of three zwitterionic surfactants, a mixture of four zwitterionic surfactants, a mixture of two amphoteric surfactants, a mixture of three amphoteric surfactants, a mixture of four amphoteric surfactants, a mixture of two ampholytic surfactants, a mixture of three ampholytic surfactants, and a mixture of four ampholytic surfactants.

Suitable examples of a combination of two surfactants of the different types include, but not limited to, a mixture of one anionic and one cationic surfactant, a mixture of one anionic and one nonionic surfactant, a mixture of one anionic and one zwitterionic surfactant, a mixture of one anionic and one amphoteric surfactant, a mixture of one anionic and one ampholytic surfactant, a mixture of one cationic and one nonionic surfactant, a mixture of one cationic and one zwitterionic surfactant, a mixture of one cationic and one amphoteric surfactant, a mixture of one cationic and one ampholytic surfactant, a mixture of one nonionic and one zwitterionic surfactant, a mixture of one nonionic and one amphoteric surfactant, a mixture of one nonionic and one ampholytic surfactant, a mixture of one zwitterionic and one amphoteric surfactant, a mixture of one zwitterionic and one ampholytic surfactant, and a mixture of one amphoteric and one ampholytic surfactant. A combination of two or more surfactants of the same type, e.g., a mixture of two anionic surfactants, is also included in the present invention.

Other Chemical Additives:

The nanofluids of the present invention may also contain one or more other chemicals to provide other desired chemical and physical properties and characteristics.

1. Hydrophilic Thermal Transfer Fluid

Suitable chemical additives for a hydrophilic thermal transfer fluid include, but are not limited to, buffering agents, corrosion inhibitors, defoamers, scale inhibitors, and dyes.

The buffering agents may be selected from any known or commonly used buffering agents. It will be appreciated by those skilled in the art that selected buffering agents can exhibit both anti-corrosion and buffering properties. In certain formulations, for example, benzoates, borates, and phosphates can provide both buffering and anti-corrosion advantages. In addition a base can be used to adjust the pH value of a nanofluid. Illustrative examples of bases for use with this invention include commonly known and used bases, for example, inorganic bases such as KOH, NaOH, NaHCO$_3$, K$_2$CO$_3$, and Na$_2$CO$_3$. Therefore, the buffering system and base can be adapted to provide a nanofluid composition with a pH level between 7.5 and about 11.

The corrosion inhibitors may be either an organic additive or an inorganic additive. Suitable organic anti-corrosive additives include short aliphatic dicarboxylic acids such as maleic acid, succinic acid, and adipic acid; triazoles such as benzotriazole and tolytriazole; thiazoles such as mercaptobenzothiazole; thiadiazoles such as 2-mercapto-5-hydrocarbylthio-1,3,4-thiadiazoles, 2-mercapto-5-hydrocarbyldithio-1, 3,4-thiadiazoles, 2,5-bis(hydrocarbylthio)-1,3,4-thiadiazoles, and 2,5-(bis)hydrocarbyldithio)-1,3,4-thiadiazoles; sulfonates; and imidazolines. Suitable inorganic additives include borates, phosphates, silicates, nitrates, nitrites, and molybdates.

Suitable defoamers include components such as silicon defoamers, alcohols such as polyethoxylated glycol, polypropoxylated glycol or acetylenic glycols.

Suitable scale inhibitors include components such as phosphate esters, phosphino carboxylate, polyacrylates, polymethacylate, styrene-maleic anhydride, sulfonates, maleic anhydride co-polymer, and acrylate-sulfonate co-polymer.

The basic composition of the nanofluids of the present invention can be tailored for selective applications. For example, nitrates and silicates are known to provide aluminum protection. Borates and nitrites can be added for ferrous metal protection, and benzotriazole and tolytriazole can be added for copper and brass protection.

2. Hydrophobic Thermal Transfer Fluid

Suitable chemical additives for a hydrophobic thermal transfer fluid include, but are not limited to, antioxidants, corrosion inhibitors, copper corrosion inhibitors, friction modifiers, viscosity improvers, pour point depressants, and seal-swelling agents.

Suitable antioxidants include phenolic antioxidants, aromatic amine antioxidants, sulfurized phenolic antioxidants, and organic phosphates. Examples include 2,6-di-tert-butylphenol, liquid mixtures of tertiary butylated phenols, 2,6-di-tert-butyl-4-methylphenol, 4,4'-methylenebis(2,6-di-tert-butylphenol), 2,2'-methylenebis(4-methyl-6-tert-butylphenol), mixed methylene-bridged polyalkyl phenols, 4,4'-thiobis(2-methyl-6-tert-butylphenol), N,N'-di-sec-butyl-p-phenylenediamine, 4-isopropylaminodiphenylamine, phenyl-alpha-naphthylamine, and phenyl-beta-naphthylamine.

Suitable corrosion inhibitors include dimer and trimer acids, such as those produced from tall oil fatty acids, oleic acid, or linoleic acid; alkenyl succinic acid and alkenyl succinic anhydride corrosion inhibitors, such as tetrapropenylsuccinic acid, tetrapropenylsuccinic anhydride, tetradecenylsuccinic acid, tetradecenylsuccinic anhydride, hexadecenylsuccinic acid, hexadecenylsuccinic anhydride; and the half esters of alkenyl succinic acids having 8 to 24 carbon atoms in the alkenyl group with alcohols such as the polyglycols. Other suitable corrosion inhibitors include ether amines; acid phosphates; amines; polyethoxylated compounds such as ethoxylated amines, ethoxylated phenols, and ethoxylated alcohols; imidazolines; aminosuccinic acids or derivatives thereof.

Suitable copper corrosion inhibitors include thiazoles such as 2-mercapto benzothiazole; triazoles such as benzotriazole, tolyltriazole, octyltriazole, decyltriazole, and dodecyltriazole; and thiadiazoles such as 2-mercapto-5-hydrocarbylthio-1,3,4-thiadiazoles, 2-mercapto-5-hydrocarbyldithio-1,3,4-thiadiazoles, 2,5-bis(hydrocarbylthio)-1,3,4-thiadiazoles, and 2,5-(bis)hydrocarbyldithio)-1,3,4-thiadiazoles.

Suitable friction modifiers include aliphatic amines, aliphatic fatty acid amides, aliphatic carboxylic acids, aliphatic carboxylic esters, aliphatic carboxylic ester-amides, aliphatic phosphonates, aliphatic phosphates, aliphatic thiophosphonates, and aliphatic thiophosphates, wherein the aliphatic group usually contains above about eight carbon atoms so as to render the compound suitably oil soluble. Also suitable are aliphatic substituted succinimides formed by reacting one or more aliphatic succinic acids or anhydrides with ammonia.

Suitable viscosity improvers include olefin copolymers, polymethacrylates, hydrogenated styrene-diene, and styrene-polyester polymers. Also suitable are acrylic polymers such as polyacrylic acid and sodium polyacrylate; high-molecular-weight polymers of ethylene oxide; cellulose compounds such as carboxymethylcellulose; polyvinyl alcohol; polyvinyl pyrrolidone; xanthan gums and guar gums; polysaccharides; alkanolamides; amine salts of polyamide; hydrophobically modified ethylene oxide urethane; silicates; and fillers such as mica, silicas, cellulose, wood flour, clays (including organoclays) and nanoclays; and resin polymers such as polyvinyl butyral resins, polyurethane resins, acrylic resins and epoxy resins.

Most pour point depressants are organic polymers, although some nonpolymeric substances have been shown to be effective. Both nonpolymeric and polymeric depressants can be used in the present invention. Examples include alkylnaphthalenes, polymethacrylates, polyfumarates, styrene esters, oligomerized alkylphenols, phthalic acid esters, ethylenevinyl acetate copolymers, and other mixed hydrocarbon polymers. The treatment level of these additives is usually low. In nearly all cases, there is an optimum concentration above and below which pour point depressants become less effective.

Suitable seal-swelling agents include dialkyl diesters of adipic, azelaic, sebacic, and phthalic acids. Examples of such materials include n-octyl, 2-ethylhexyl, isodecyl, and tridecyl diesters of adipic acid, azelaic acid, and sebacic acid, and n-butyl, isobutyl, pentyl, hexyl, heptyl, octyl, nonyl, decyl, undecyl, dodecyl, and tridecyl diesters of phthalic acid. Also useful are aromatic hydrocarbons with suitable viscosity.

In addition to the chemicals listed, many other known types of additives such as dyes, foam inhibitors, demulsifiers, and air release agents, can also be included in finished compositions produced and/or used in the practice of the present invention. In general, the additive components are employed in nanofluids in minor amounts sufficient to enhance the performance characteristics and properties of the base fluid. The amounts will thus vary in accordance with such factors as the viscosity characteristics of the base fluid employed, the viscosity characteristics desired in the finished fluid, the service conditions for which the finished fluid is intended, and the performance characteristics desired in the finished fluid.

Physical Agitation:

The nanofluid of the present invention is prepared by dispersing a mixture of the appropriate surfactant, lubricant, carbon nanomaterials, and other chemical additives using a physical method to form a stable suspension of carbon nanoparticles in a thermal transfer fluid. A variety of physical mixing methods can be used in the present invention, including high shear mixing, such as with a high speed mixer, homogenizers, microfluidizers, high impact mixing, and ultrasonication methods. Among these methods, ultrasonication is the least destructive to the structures of carbon nanoparticles. Ultrasonication can be done either in the bath-type ultrasonicator, or by the tip-type ultrasonicator. Typically, tip-type ultrasonication is for applications which require higher energy output. Ultrasonication at a medium-high instrumental intensity for up to 60 minutes, and usually in a range of from 10 to 30 minutes is desired to achieve better homogeneity. Additional, the mixture is ultrasonicated intermittently to avoid overheating. It is well known that overheating can break the carbon nanotubes to lose conjugated bonds and hence lose their beneficial physical properties. The terms "ultrasonication" and "sonication" are used interchangeably throughout the instant disclosure.

The raw material mixture may be pulverized by any suitable known dry or wet grinding method. One grinding method includes pulverizing the raw material mixture in the fluid mixture of the present invention to obtain a concentrate, and the pulverized product may then be dispersed further in a liquid medium with the aid of the dispersants described above. However, pulverization or milling often reduces the carbon nanotube average aspect ratio.

It will be appreciated that the individual components can be separately blended into the base fluid or can be blended therein in various subcombinations, if desired. Ordinarily, the particular sequence of such blending steps is not critical. Moreover, such components can be blended in the form of separate solutions in a diluent. It is preferable, however, to blend the components used in the form of an additive concentrate as this simplifies the blending operations, reduces the likelihood of blending errors, and takes advantage of the compatibility and solubility characteristics afforded by the overall concentrate.

Physical agitation methods particularly suitable for making nanogrease are these relatively high shearing or dispersing devices, including, but not limited to, Morehouse mills, Buxton knife mills, Gaulin homogenizers, colloid mills, rotating knife-edge mills, rotor-stator mills, and three-roll mills. In an exemplary embodiment, after a final grease composition is achieved, the resulting grease is generally passed one or more times through one of these shearing or dispersing devices to enhance the characteristics (e.g., smoothness, shear stability, oil separation and bleed properties) and to maximize the thickening power of a grease thickener, such as carbon nanotubes.

Hydrophilic Nanofluids:

The hydrophilic nanofluid is a dispersion of carbon nanoparticles in a hydrophilic thermal transfer fluid in the present of surfactants. The surfactants are used to stabilize the nanoparticle dispersion. The hydrophilic thermal transfer fluid may contain one or more hydrophilic molecules. For example, the hydrophilic thermal transfer fluid may contain water, aliphatic alcohols, alkylene glycols, or various mixtures thereof. The hydrophilic thermal transfer fluid may also contain water, alkylene glycols, and various mixtures thereof. More specifically, the hydrophilic thermal transfer fluid contains water, ethylene glycol, diethylene glycol, and mixtures thereof.

In one aspect, the hydrophilic thermal transfer fluid is a two-component mixture which contains water and ethylene glycol in various proportions. In particular, the hydrophilic thermal transfer fluid contains about 0.1 to about 99.9%, about 20 to about 80%, about 40 to about 60%, or about 50% by volume of water.

In another aspect, the hydrophilic thermal transfer fluid is a three-component mixture which contains water, ethylene glycol, and diethylene glycol in various proportions. The hydrophilic thermal transfer fluid may contain about 0.1 to about 99.9% by volume of water, about 0.1 to 99.9% by volume of ethylene glycol, and about 0.1 to 99.9% by volume of diethylene glycol. The hydrophilic thermal transfer fluid may contain about 20 to about 80%, about 40 to about 60%, or about 50% by volume of water or ethylene glycol. Typically, diethylene glycol constitutes a minor component of the hydrophilic thermal transfer fluid, in no greater than about 20%, no greater than about 10%, or no greater than about 5% of the total volume. Nevertheless, the total amount of all the components in a hydrophilic thermal transfer fluid together should equal to 100%.

In an exemplary embodiment, the hydrophilic nanofluid comprises three types of components: a hydrophilic thermal transfer fluid, carbon nanoparticles, and a surfactant. In one aspect, the hydrophilic nanofluid contains no less than about 80%, no less than about 85%, no less than about 90%, or no less than about 95% by weight of a hydrophilic thermal transfer fluid.

In another aspect, the hydrophilic nanofluid contains no greater than about 10%, no greater than about 5%, no greater than about 2.5%, or no greater than about 1% by weight of carbon nanoparticles. The carbon nanoparticles are selected from diamond nanoparticles, graphite nanoparticles, fullerenes, carbon nanotubes, carbon fibers, and combinations thereof. The carbon nanoparticles may be functionalized carbon nanoparticles, including soluble carbon nanoparticles in a hydrophilic thermal transfer fluid.

In yet another aspect, the hydrophilic nanofluid contains at least one surfactant as a dispersant agent to stabilize the nanoparticle suspension. The surfactant is selected from anionic, cationic, nonionic, zwitterionic, amphoteric, ampholytic surfactants, and combinations thereof. The hydrophilic nanofluid contains from about 0.1 to about 30%, from about 1 to about 20%, from about 1 to about 15%, or from about 1 to about 10% by weight of a surfactant.

The nanofluid may also comprise other additives to improve chemical and/or physical properties. Typically, the amount of these additives together is no greater than 10% by weight of the nanofluid. Nevertheless, the total amount of all the ingredients of the nanofluid together should equal to 100%.

The hydrophilic nanofluid is prepared by dispersing carbon nanoparticles directly into a mixture of a hydrophilic thermal transfer fluid and other additives in the present of at least one surfactant with a physical agitation, such as ultrasonication. The ultrasonication is operated in intermittent mode to avoid causing structural damage to carbon nanoparticles. The carbon nanoparticle-containing mixture is energized for a predetermined period of time with a break in between. Each energizing period is no more than about 30 min, preferably no more than about 15 min, more preferably no more than 10 min, and most preferably no more than 5 min. The break between ultrasonication pulses provides the opportunities for the energized carbon nanoparticles to dissipate the energy. The break is no less than about 1 min, no less than about 2 min, no less than about 5 min, or between about 5 to about 10 min. The order of addition of the individual components is not critical for the practice of the invention. However, it is desired to the hydrophilic nanofluid composition be thoroughly blended and that all the components be completely dissolved to provide optimum performance.

The hydrophilic nanofluid of carbon nanoparticles thus produced has enhanced thermal properties and physical and chemical characteristics. Addition of solid carbon nanoparticles, in particular, carbon nanotubes, enhances both thermal conductivity and lowers freezing point of the thermal conductive fluid. Incorporation of about 0.05% by weight of carbon nanotubes, the thermal conductivity is increased from 0.45 to about 0.48-0.50, which is an about 6 to 11% increase. In addition, the freezing point of the thermal transfer fluid is also lowered significantly. Incorporation of about 0.05% by weight of carbon nanotubes, the freezing point is decreased from −35.6 to −40° C., which is about 12% decrease.

In an alternative embodiment, the hydrophilic nanofluid is a homogenous nanofluid, which comprises a hydrophilic thermal transfer fluid and soluble carbon nanoparticles. The hydrophilic thermal transfer fluid may contain one or more hydrophilic molecules. For example, the hydrophilic thermal transfer fluid may contain water, aliphatic alcohols, alkylene glycols, or various mixtures thereof. The hydrophilic thermal transfer fluid may also contain water, alkylene glycols, and various mixtures thereof. More specifically, the hydrophilic thermal transfer fluid contains water, ethylene glycol, diethylene glycol, and mixtures thereof. The hydrophilic thermal transfer fluid may be a two-component mixture or a three-component mixture as described hereinabove. Suitable soluble carbon nanoparticles for a homogenous nanofluid are those containing hydrophilic functional groups on surface, including, but not limited to, sulfone, hydroxyl, carboxyl, or amino.

The homogenous nanofluid may contains no greater than about 5%, no greater than about 2.5%, no greater than about 1%, no greater than about 0.5%, no greater than about 0.2%, no greater than about 0.1%, no greater than about 0.05%, no greater than about 0.02%, or no greater than about 0.01% by weight of soluble carbon nanoparticles.

The hydrophilic nanofluid may further comprises one or more surfactants and other chemical additives to improve chemical and/or physical properties. Typically, the amount of these other chemicals together is no greater than 10% by weight of the nanofluid. Nevertheless, the total amount of all the ingredients of the nanofluid together should equal to 100%.

The homogenous hydrophilic nanofluid is prepared by dissolving soluble carbon nanoparticles directly into a mixture of a hydrophilic thermal transfer fluid, surfactants and other additives with a physical agitation, such as ultrasonication. The ultrasonication is operated in intermittent mode to avoid causing structural damage to carbon nanoparticles. The carbon nanoparticle-containing mixture is energized for a predetermined period of time with a break in between. Each energizing period is no more than about 10 min, no more than about 5 min, no more than about 2 min, no more than 1 min, or on more than about 30 seconds. The break between ultrasonication pulses provides the opportunities for the energized carbon nanoparticles to dissipate the energy. The break is no less than about 1 min, no less than about 2 min, no less than about 5 min, or between about 5 to about 10 min. The order of addition of the individual components is not critical for the practice of the invention. However, it is desired to the hydrophilic nanofluid composition be thoroughly blended and that all the components be completely dissolved to provide optimum performance.

Nanolubricants:

The nanolubricant of the present invention is a dispersion of carbon nanoparticles in a hydrophobic thermal transfer fluid. The nanolubricant may further comprise one or more surfactants to stabilize the nanoparticle dispersion. In one aspect, the hydrophobic thermal transfer fluid of the nanolubricant is selected from petroleum distillates, synthetic petroleum oils, greases, gels, oil-soluble polymer composition, vegetable oils, and combinations thereof. The hydrophobic thermal transfer fluid is preferably synthetic petroleum oils, such as polyalphaolefins, polyol esters, or combinations thereof. The nanolubricant may contain from about 40 to about 99%, from about 50 to about 98%, from about 60 to about 97%, from about 70 to about 96%, from about 80 to about 95%, or from about 85 to about 95% by weight of a hydrophobic thermal transfer fluid. The hydrophobic thermal transfer fluid may have a viscosity of from about 2 to about 800 centistokes, from about 4 to about 500 centistokes, or from about 10 to about 200 centistokes.

In another aspect, the carbon nanoparticles of the nanolubricant are selected from diamond nanoparticles, graphite nanoparticles, fullerenes, carbon nanotubes, carbon fibers, and combinations thereof. The nanolubricant contains no greater than about 30%, no greater than 15%, no greater than about 10%, or no greater than about 5% by weight of carbon nanoparticles.

In yet another aspect, the nanolubricant contains one or more surfactants as a dispersant agent to stabilize the nanoparticle suspension. The surfactant is selected from anionic, cationic, nonionic, zwitterionic, amphoteric, ampholytic surfactants, and combinations thereof. The nanolubricant may contain from about 0.1 to about 30%, from about 1 to about 20%, from about 1 to about 15%, from about 1 to about 10% by weight of surfactants.

The nanolubricant may also comprise other additives to enhance chemical and/or physical properties. Typically, the amount of these additives together is no greater than 10% by weight of the nanolubricant. In any case, the total amount of all the ingredients of the nanolubricant together equals to 100%.

The nanolubricant of the present invention can be prepared by three different dispersing methods. In the first process, dry carbon nanoparticles are dispersed directly into a hydrophobic thermal transfer fluid and other additives in the present of surfactants with a physical agitation, such as ultrasonication. Preferably, the ultrasonication is operated in intermittent mode to avoid causing structural damage to carbon nanoparticles. The carbon nanoparticles-containing mixture is energized for a predetermined period of time with a break in between. Each energizing period is no more than about 30 min, no more than about 15 min, no more than 10 min, or no more than 5 min. The break between ultrasonication pulses provides the opportunities for the energized carbon nanoparticles to dissipate the energy. The break may be no less than about 1 min, no less than about 2 min, no less than about 5 min, or from about 5 to about 10 min. The order of addition of the individual components is not critical for the practice of the invention. However, it is desired to the nanofluid composition be thoroughly blended and that all the components be completely dissolved to provide optimum performance.

The second dispersing process is carried out in three stages. At first, carbon nanoparticles are dispersed into a volatile solvent to form an intermediate dispersion with help of a physical agitation, such as ultrasonication. Suitable volatile solvents are organic solvents, such as halogenated solvents such as chloroform, methylene chloride, and 1,2-dichloroethane; ethers such as diethyl ether; carboxylic esters such as ethyl acetate; carbonyl solvents such as acetone; nitriles such as acetonitrile; amides such as dimethylformide; alcohols such methanol, ethanol, and isopropanol, and combinations thereof. Preferably, the solvent used in the present invention has a boiling point less than 300° C., less than 200° C., or 150° C. At second, a hydrophobic thermal transfer fluid, surfactants, and other additives are added into this intermediate dispersion and mixed thoroughly with a physical agitation, such as ultrasonication. At this step, the order of addition of the individual components is not critical for the practice of the invention. However, it is desired to the nanofluid composition be thoroughly blended and that all the components be completely dissolved to provide optimum performance. At last, the volatile solvent is removed under vacuum to produce a uniformly dispersed nanofluid. Heating can also be applied to accelerate the solvent removal process. When ultrasonication is used as a dispersion method, it is preferably to be operated in an intermittent mode aforementioned to avoid causing structural damages to the nanoparticles used.

The third dispersing process is performed at elevated temperatures. Prior to the addition of carbon nanoparticles, a homogeneous mixture or solution of surfactants and other additives in a hydrophobic thermal transfer fluid is prepared. Heating and a physical agitation, such as mechanical stirring, can also be applied to help the preparation of the mixture. At this step, the order of addition of the individual components is not critical for the practice of the invention. However, it is desired to the nanofluid composition be thoroughly blended and that all the components be completely dissolved to provide optimum performance. The dispersion of carbon nanoparticles is then carried out at an elevated temperature range, at which no adversary reactions occur between the chemicals and carbon nanoparticles, and of which the highest temperature is below the boiling point of any chemical in the hydrophobic thermal transfer fluid. The operational temperature range in the present invention is from about 50 to about 300° C., from about 70 to about 275° C., from about 80 to about 250° C., or from about 90 to 225° C. During the dispersion process, carbon nanoparticles are added slowly in small portion over a predefined period of time in the present of a physical agitation, such as mechanical stirring. The period of time is determined based on factors such as the scale of the production and the efficiency of mixing, including, but not limited to, 1 min, 2 min, 5 min, 10 min, 20 min, 30 min, 40 min, 50 min, 1 hr, and longer. After addition, the mixture is blended further at an elevated temperature or room temperature to ensure the homogeneity of the dispersion. The nanofluid thus prepared is stable even after cooling down to room temperature. This high temperature dispersion process provides several advantages over the current available technologies. The dispersion process is simple, economical, and environmental friendly. The process is also highly scalable and can be readily adapted for large industrial-scale production.

In an alternative embodiment, the hydrophobic nanolubricant is a homogenous nanofluid, which comprises a hydrophobic thermal transfer fluid as described hereinabove, and soluble carbon nanoparticles. Suitable soluble carbon nanoparticles for a homogenous nanolubricant are those containing hydrophobic functional groups on surface, including, but not limited to, alkyls and aryls.

The homogenous nanolubricant may contain no greater than about 5%, no greater than about 2.5%, no greater than about 1%, no greater than about 0.5%, no greater than about 0.2%, no greater than about 0.1%, no greater than about 0.05%, no greater than about 0.02%, or no greater than about 0.01% by weight of soluble carbon nanoparticles.

The homogenous nanolubricant may further comprise one or more surfactants and other chemical additives to improve chemical and/or physical properties. Typically, the amount of these other chemicals together is no greater than 10% by weight of the nanolubricant. Nevertheless, the total amount of all the ingredients of the nanolubricant together should equal to 100%.

The homogenous nanolubricant is prepared by dissolving soluble carbon nanoparticles directly into a mixture of a hydrophobic thermal transfer fluid, surfactants and other additives with a physical agitation, such as ultrasonication. The ultrasonication is operated in intermittent mode to avoid causing structural damage to carbon nanoparticles. The carbon nanoparticle-containing mixture is energized for a predetermined period of time with a break in between. Each energizing period is no more than about 10 min, no more than about 5 min, no more than 2 min, no more than 1 min, or on more than about 30 seconds. The break between ultrasonication pulses provides the opportunities for the energized carbon nanoparticles to dissipate the energy. The break is no less than about 1 min, no less than about 2 min, no less than about 5 min, or between about 5 to about 10 min. The order of addition of the individual components is not critical for the practice of the invention. However, it is desired to the hydrophilic nanofluid composition be thoroughly blended and that all the components be completely dissolved to provide optimum performance.

Nanogreases:

The nanogrease of the present invention is a dispersion of carbon nanoparticles in a hydrophobic thermal transfer fluid. In one embodiment, the nanogrease comprises a thermal transfer fluid and carbon nanoparticles. In another embodiment, the nanogrease further comprises one or more surfactants. In another embodiment, the nanogrease does not contain a surfactant for enhancing the dispersion of solid carbon nanotubes. Optionally, the mixture can also contain other additives to enhance chemical and/or physical properties. In an alternative embodiment, the nanogrease further comprises soluble carbon nanoparticles to enhance the thermal conductivity of the nanogrease.

The nanogrease is prepared by blending a mixture of a hydrophobic thermal transfer fluid, carbon nanoparticles, at least one surfactant, and other chemical additives together with help of a physical agitation. The hydrophobic thermal transfer fluid contains one or more organic oils. In one aspect, the hydrophobic thermal transfer fluid of the nanogrease is selected from petroleum distillates, synthetic petroleum oils, greases, gels, oil-soluble polymer composition, vegetable oils, and combinations thereof. Preferably, the thermal transfer fluid is synthetic petroleum oils, such as polyalphaolefins, polyol esters, and combinations thereof. The nanogrease may contain from about 60 to about 99%, from about 70 to about 98%, from about 80 to about 96%, or about 80 to about 90% by weight of a thermal transfer fluid. The thermal transfer fluid preferably has a viscosity of from about 2 to about 800, from about 4 to about 500 centistokes, from about 10 to about 200, or from about 50 to about 150 centistokes.

In another aspect, the carbon nanoparticles of the nanogrease are selected from diamond nanoparticles, graphite nanoparticles, fullerenes, carbon nanotubes, carbon fibers, and combinations thereof. The nanogrease contains no greater than about 30%, no greater than about 15%, no greater than about 10%, no greater than about 5%, or no greater than 2% by weight of carbon nanoparticles.

In yet another aspect, the nanogrease contains at least one surfactant as a dispersant agent to stabilize the nanoparticle suspension. The surfactant is selected from anionic, cationic, nonionic, zwitterionic, amphoteric, ampholytic surfactants, and combinations thereof. The nanogrease contains from about 0.1 to about 30%, from about 1 to about 20%, or from about 5 to 15% by weight of the surfactant. Typically, the amount of these additives together is no greater than 10% by weight of the nanogrease. In any case, the total amount of all the ingredients of the nanogrease together equals to 100%.

In still another aspect, the nanogrease comprises carbon nanoparticles without a surfactant. The carbon nanoparticles of the nanogrease are selected from diamond nanoparticles, graphite nanoparticles, fullerenes, carbon nanotubes, carbon fibers, and combinations thereof. The nanogrease contains no greater than about 30%, no greater than about 15%, no greater than about 10%, no greater than about 5%, or no greater than about 1% by weight of carbon nanoparticles.

The nanogrease of the present invention is prepared by dispersing dry carbon nanoparticles directly into a mixture of a thermal transfer fluid and other additives in the present of at least one surfactant with a physical agitation, such as a three roll milling machine, to produce homogeneous and stable nanoparticle dispersion.

The nanogrease containing carbon nanoparticles has remarkable heat resistance, thermal conductivity, and stability. Typically, the nanogrease prepared from a thermal transfer fluid with a viscosity of below 50 centistokes has a dropping point of greater than 260° C. as measured according to ASTM, an oil separation degree of no greater than 5%, a thermal conductivity of no less than 5 W/m·K. The dispersion property of a nanogrease is affected by the structural properties of carbon nanotubes and the manufacture method. In general, MWNT with smaller diameters shows better dispersion property.

Newtonian Nanofluid:

The Newtonian nanofluid of the present invention is a dispersion or solution of carbon nanoparticles in a thermal transfer fluid, whose shear stress is linearly proportional to the velocity gradient in the direction perpendicular to the plane of shear. The Newtonian nanofluid may be a hydrophilic nanofluid or a hydrophobic nanofluid, such as a nanolubricant as described hereinabove.

Non-Newtonian Nanofluid:

The non-Newtonian nanofluid of the present invention is a dispersion of carbon nanoparticles in a thermal transfer fluid, whose viscosity changes with the applied strain rate. The non-Newtonian nanofluid may be a hydrophobic nanofluid, such as a nanolubricant or nanogrease as described hereinabove. A Newtonian nanofluid can be converted into a non-Newtonian nanofluid by adding a chemical additive, such as a thickener.

EXAMPLES

Carbon nanotubes from several commercial sources were used in the following examples and their information is summarized in Table 1.

TABLE 1

| Carbon Nanotubes | | |
|---|---|---|
| Abbreviation | Product Information | Commercial Source |
| MWNT-HMSI | MWNT with a diameter of 10-20 nm and a length of 0.5-40 micrometers | Helix Material Solution Inc |
| MWNT-MER | MWNT with a diameter of 140 ± 30 nm, a length of 7 ± 2 micrometers, and a purity of over 90%. | Materials and Electrochemical Research Corporation |
| MWNT-RAO | MWNT with diameter 20-25nm, | RAO |
| SWNT-MER | SWNT 0.7-1.2 nm in diameter, 10-50 micron lengths. | MER |
| SWNT-CAR | Purified CAR SWNT (AP CAR) | CarboLex |
| SWNT-CNI | ESD SWNT | CNI |
| D-SWNT-CNI | D-SWNT bundles | CNI |

TABLE 1-continued

| Carbon Nanotubes | | |
|---|---|---|
| Abbreviation | Product Information | Commercial Source |
| F-SWNT-CNI | Purified F-SWNT | CNI |
| SWNT-HIPCO | SWNT | Hipco |
| Sulfonated CT | Sulfonated carbon nanotube | |

In addition, two standard solutions were used throughout all examples for preparing hydrophilic nanofluids: the "PAC Solution", which is a one-to-one mixture of Prestone antifreeze coolant ("PAC") and water, and the "EG Solution" is a one-to-one mixture of ethylene glycol ("EG") and water. Some of the hydrophobic base oils used in preparing hydrophobic nanofluids, such as nanolubricants and nanogreases, are listed in Table 2 with their properties.

TABLE 2

| Base Oils in Nanolubricants and Nanogreases | | | | |
|---|---|---|---|---|
| Product Name | Supplier | Product Description | Density (g/mL) | Viscosity (cSt at 40° C.) |
| Durasyn 166 | BP | 6 cSt PAO | 0.837 @ 15.6° C. | 31 |
| SHF403 | ExxonMobil | 40 cSt PAO | 0.849 @ 15.6° C. | 391 |
| Esterex NP4101 | ExxonMobil | Neopolyol ester | 0.928 @ 15.6° C. | 58.3 |
| KR-015 | King Industries | Alkylated naphthalene | 0.884 @ 25° C. | 114 |

Example 1

Acid Treatment of Carbon Nanotubes

A suspension of carbon nanotubes (5% by weight) in sulfuric acid/nitrate acid (3:1) was heated at 110° C. under nitrogen for about 3 days. The suspension was then diluted with deionized water and filtered to remove the acids. After further washed with acetone and deionized water, the solid was dried in an oven at about 60 to 70° C. overnight.

Example 2

Preparation of a SWNT-Containing Nanofluid

A SWNT nanofluid in EG Solution was prepared by dispersing dry carbon nanotubes into a mixture of the thermal transfer fluid (i.e., EG Solution) and a surfactant as a dispersant according to the composition and condition specified in Table 3. The dispersion was carried out by ultrasonication intermittently for 15 min using Digital Sonifier Model 102C by Branson Ultrasonics Corporation (Monroe Township, N.J.), to avoid causing structural damage to carbon nanotubes. Typically, the carbon nanoparticle-containing mixture is energized for 1-2 min with a break about 5-10 min in between.

TABLE 3

| Component | Description | Weight (%) |
|---|---|---|
| Carbon nanotube | F-SWNT-CNI, untreated | 0.05 |
| Surfactant | Nanolab dispersant | 5.00 |
| Heat transfer fluid | EG Solution | 94.85 |

TABLE 3-continued

| Component | Description | Weight (%) |
|---|---|---|
| Ultrasonication Time | 15 min | |
| Dispersion Quality | Good | |
| Dispersion Stability | More than one week | |

Example 3

Preparation of a SWNT-Containing Nanofluid

A nanofluid with the composition specified in Table 4 was prepared as described in Example II.

TABLE 4

| Component | Description | Weight (%) |
|---|---|---|
| Carbon nanotube | F-SWNT-CNI, untreated | 0.10 |
| Surfactant | SDBS | 1.00 |
| Heat transfer fluid | EG Solution | 98.90 |
| Ultrasonication Time | 20 min | |
| Dispersion Quality | Good | |
| Dispersion Stability | More than one month | |

Example 4

Preparation of a SWNT-Containing Nanofluid

A nanofluid with the composition specified in Table 5 was prepared as described in Example II.

TABLE 5

| Component | Description | Weight (%) |
|---|---|---|
| Carbon nanotube | F-SWNT-CNI, untreated | 0.2 |
| Surfactant | SDBS | 1.0 |
| Heat transfer fluid | PAC Solution | 98.8 |
| Other additives | TGA | 0.01-0.03% |
| Ultrasonication Time | 25 min | |
| Dispersion Quality | Good | |
| Dispersion Stability | More than one month | |

Example 5

Preparation of a SWNT-Containing Nanofluid

A nanofluid with the composition specified in Table 6 was prepared as described in Example II.

TABLE 6

| Component | Description | Weight (%) |
|---|---|---|
| Carbon nanotube | F-SWNT-CNI, untreated | 0.05 |
| Surfactant | SDBS | 1.50 |
| Heat transfer fluid | PAC Solution | 98.45 |
| Ultrasonication Time | 15 min | |
| Dispersion Quality | Good | |
| Dispersion Stability | More than two weeks | |

Example 6

Preparation of a SWNT-Containing Nanofluid

A nanofluid with the composition specified in Table 7 was prepared as described in Example II.

TABLE 7

| Component | Description | Weight (%) |
|---|---|---|
| Carbon nanotube | D-SWNT-CNI, acid treated | 0.05 |
| Surfactant | SDBS | 1.00 |
| Heat transfer fluid | PAC Solution | 98.95 |
| Ultrasonication Time | 20 min | |
| Dispersion Quality | Good | |
| Dispersion Stability | More than two weeks | |

Example 7

Characterization of Carbon Nanotube-Containing Nanofluids

The two samples tested here both contain 0.05 wt % F-SWNT-CNI dispersed in PAC Solution but with different pH values. The pH value of sample A is 9.95 whereas the pH value of sample B is 10.73. Freezing points were determined according to ASTM D1177. The current experiment was carried out as follows: the fluids were first frozen in the refrigerator, the frozen samples were then thawed at room temperature, after thawing, and the samples were poured into a 250 ml beaker so that the extent of sedimentation or agglomeration could be determined qualitatively through visual inspection of the beaker. Before and after the freeze and thaw process, the two samples are stable and no precipitations were observed on either the side or bottom of the beaker. As shown in Table 8, there is no pH effect on the freezing point of the carbon nanoparticle-containing antifreeze coolant. Interestingly, however, carbon nanotube lowered freezing point of PAC Solution.

TABLE 8

| Sample | Refractometer reading (° C.) | Freeze Point (° C.) | Visual Stability Before | After |
|---|---|---|---|---|
| A | −40.6 | −39.5 | Clean | Clean |
| B | −41.1 | −39.8 | Clean | Clean |

Example 8

Effect of Carbon Nanotube Loading on Freezing Point

Three nanofluids in PAC Solution were prepared with different carbon nanotube loadings, including 0.05%, 0.10%, and 0.20%. Freezing points for these samples were then measured and summarized in Table 9. Clearly, the carbon nanotube loading has a significant effect on the freezing point of the nanofluid. The freezing point decreases as the loading increases. Similar effects were also observed with nanofluids of D-SWNT in EG Solution.

TABLE 9

| Nanofluid Composition | Freezing point (° C.) |
|---|---|
| PAC Solution | −35.6 |
| 0.05 wt % F-SWNT-CNI in PAC Solution | −40 |
| 0.10 wt % F-SWNT-CNI in PAC Solution | −41.1 |
| 0.20 wt % F-SWNT-CNI in PAC Solution | −42.8 |

TABLE 9-continued

| Nanofluid Composition | Freezing point (° C.) |
|---|---|
| 0.10 wt % D-SWNT-CNI in EG Solution | −40.6 |
| 0.20 wt % D-SWNT-CNI in EG Solution | −42.2 |

Example 9

Determination of the Thermal Conductivities

The thermal conductivities ("TC") of the nanofluid of the present invention were measured at room temperature using a hot disk thermal constant analyzer (Swedish Inc.). Sensor depth was set at 6 mm. Out power was set at 0.025 W. Means time was set at 16 s. Radius was set at 2.001 mm. TCR was set at 0.00471/K. Disk type of kapton was used. Tem. drift rec was on. As shown in Table 10, the thermal conductivity is increased as the carbon nanoparticle loading increases.

TABLE 10

| Nanofluid Composition | TC |
|---|---|
| 0.05% SWNT-CNI in PAC Solution with 1.00 wt % SDBS | 0.50 |
| 0.05% Acid Treated SWNT in PAC Solution with 1.00 wt % SDBS | 0.49 |
| 0.05% SWNT-HIPCO in PAC Solution with 1.00 wt % SDBS | 0.48 |
| PAC Solution with 1.00 wt % SDBS | 0.45 |

Example 10 pH Determination

The pH values of carbon nanoparticle suspensions in a PAC Solution were measured using UP-10 pH meter (Denver Instrument at Denver, Colo.). Five different kinds of carbon nanotubes were used, including three SWNTs, that is, acid-treated, untreated, and purified F-SWNT, and two MWNTs, that is, helix and catalytic. The loading of carbon nanotubes was varied from 0.02 to 0.05% by weight. The surfactant or dispersant used in this example is sodium dodecylbenzene sulfonate ("SDBS"). As shown in Table 11, all PAC solutions have relatively high pHs. For some applications, it would be beneficial to neutralize the dispersion to 7 to prevent possible corrosion. Both inorganic acids such as HCl and organic acids such as thiolgycolic acid ("TGA") and 3-mercaptopropionic acid ("MPA") can be used to adjust pH. However, organic acids provide an additional advantage over inorganic acids. Organic acids can also stabilize the nanoparticles dispersion.

TABLE 11

| Nanofluid Composition | pH |
|---|---|
| EG Solution | 6.55 |
| PAC Solution | 10.48 |
| PAC solution with 1.00 wt % SDBS | 9.59 |
| 0.05 wt % SWNT-CNI in PAC solution with 1.00 wt % SDBS | 10.03 |
| 0.05 wt % SWNT-CAR in PAC solution with 1.00 wt % SDBS | 10.13 |
| 0.05 wt % SWNT-MER in PAC solution with 1.00 wt % SDBS | 10.19 |
| 0.05 wt % MWNT-RAO in PAC solution with 1.00 wt % SDBS | 10.15 |
| 0.05 wt % acid treated SWNT-CNI in PAC solution with 1.00 wt % SDBS | 9.93 |
| 0.05 wt % acid treated SWNT-HIPCO in PAC solution with 1.00 wt % SDBS | 9.78 |
| 0.05 wt % F-SWNT-CNI in PAC solution with 1.00 wt % SDBS | 9.34 |

TABLE 11-continued

| Nanofluid Composition | pH |
|---|---|
| 0.02 wt % acid treated SWNT-HIPCO in PAC solution with 1.00 wt % SDBS | 9.84 |

Example 11

Preparation of a Homogenous Nanofluid

A nanofluid in EG Solution, which contains soluble carbon nanoparticles, was prepared by dissolving soluble carbon nanotubes into a mixture of the thermal transfer fluid (i.e., EG Solution) with ultrasonication intermittently. First, water (50 g) and ethylene glycol (50 g) were mixed thoroughly to yield a EG solution. Then, 0.2 g of sulfonated carbon nanotube was added and ultrasonicated using Digital Sonifier Model 102C by Branson Ultrasonics Corporation (Monroe Township, N.J.) for 10 times, each 30 seconds to avoid causing structural damage to carbon nanotubes due to overheating, to yield a homogenous nanofluid with a single phase. The homogenous nanofluid showed more than 20% increase in heat transfer efficiency. The nanofluid also demonstrated good stability. Since this homogenous nanofluid does not contain a chemical surfactant, it eludes the foaming problem, a critical issue for industrial application.

Example 12

A Nanofluid of MWNT in ROYCO® 500

A MWNT nanofluid in ROYCO® 500 was prepared by mixing dry carbon nanotubes, a dispersant, thermal transfer fluid together according to the proportions specified in Table 12. The mixture was then ultrasonicated using Digital Sonifier Model 102C by Branson Ultrasonics Corporation (Monroe Township, N.J.). The sonication was carried out sporadically (i.e., intermittently) at room temperature for 15 to 30 min, to avoid damaging and altering the structures of carbon nanotubes. Typically, the carbon nanoparticles-containing mixture was energized for 1-2 min with a break about 5-10 min in between.

TABLE 12

| Component | Description | Weight |
|---|---|---|
| Carbon Nanotube | MWNT-HMSI, surface untreated | 0.1% |
| Surfactant | AEROSOL ® OT-MSO | 5.0% |
| Heat transfer fluid | ROYCO ® 500 | 94.9% |
| Sonication | 15 min in an intermittent mode | |
| Dispersion and stability | Dispersion was very good, stability lasted more than one month. | |

Example 13

A Nanofluid of MWNT in DURASYN® 166

A MWNT nanofluid in DURASYN® 166 was prepared according to the procedure described in Example II. The composition of the nanofluid is summarized in Table 13.

TABLE 13

| Component | Description | Weight |
|---|---|---|
| Carbon nanotube | MWNT-HMSI, surface untreated | 0.1% |
| Surfactant | AEROSOL ® OT-MSO | 5% |
| Heat transfer fluid | DURASYN ® 166 | 94.9% |
| Sonication | 15 min in an intermittent mode | |
| Dispersion and stability | Dispersion was very good, stability lasted more than one month. | |

Example 14

A Nanofluid of MWNT in ROYCO® 500

The MWNT used in this example was obtained from Materials and Electrochemical Research Corporation ("MER"). Those carbon nanotubes were produced by chemical vapor deposition and have a diameter of 140±30 nm, a length of 7±2 micron, and a purity of over 90%. A MWNT nanofluid in ROYCO® was prepared according to the procedure described in Example 11. The composition of the nanofluid is summarized in Table 14.

TABLE 14

| Component | Description | Weight |
|---|---|---|
| Carbon nanotube | MWNT-MER, surface untreated | 0.1% |
| Surfactant | AEROSOL ® OT-MSO | 5.0% |
| Heat transfer fluid | ROYCO ® 500 | 94.9% |
| Sonication | 15 min in an intermittent mode | |
| Dispersion and stability | Dispersion was very good, stability lasted more than one month. | |

Example 15

A Nanofluid of MWNT in ROYCO® 500

A MWNT nanofluid in ROYCO® 500 was prepared according to the procedure described in Example II. The composition of the nanofluid is summarized in Table 15.

TABLE 15

| Component | Description | Weight |
|---|---|---|
| Carbon nanotube | MWNT-HMSI, surface untreated | 0.1% |
| Surfactant | AEROSOL ® TR70% | 5.0% |
| Heat transfer fluid | ROYCO ® 500 | 94.9% |
| Sonication | 15 min in an intermittent mode | |
| Dispersion and stability | Dispersion was very good, stability lasted more than one month. | |

Example 16

A Nanofluid of D-SWNT in DURASYN® 166

A MWNT nanofluid in DURASYN®166 was prepared according to the procedure described in Example II. The composition of the nanofluid is summarized in Table 16.

TABLE 16

| Component | Description | Weight |
|---|---|---|
| Carbon nanotube | D-SWNT-CNI, surface untreated | 3% |
| Surfactant | Chevron oronite, OLOA 11002 | 5% |

TABLE 16-continued

| Component | Description | Weight |
|---|---|---|
| Heat transfer fluid | DURASYN ® 166 | 92% |
| Sonication | 30 min in an intermittent mode | |
| Dispersion and stability | Dispersion was very good, stability lasted more than one month. | |

Example 17

A Nanofluid of D-SWNT in DURASYN® 166

In this experiment, a dry carbon nanotube (3 g) was first dispersed in chloroform (100 ml) with help of a physical agitation, such as intermittent ultrasonication. Then, polyalphaolefin (DURASYN® 166), a synthetic oil (92 g, 110 ml), and OLOA 11002 surfactant (5 g) were added to this chloroform dispersion and blended thoroughly with help of a physical agitation, such as intermittent ultrasonication. Chloroform was removed by distillation with mechanical stirring. Final drying was done under heated dynamic vacuum. The composition of the nanofluid is summarized in Table 17.

TABLE 17

| Component | Description | Weight |
|---|---|---|
| Carbon nanotube | D-SWNT, surface untreated | 3% |
| Surfactant | Chevron oronite, OLOA 11002 | 5% |
| Heat transfer fluid | DURASYN ® 166 containing synthetic polyalphaolefin oils | 92% |
| Sonication | 30 min in an intermittent mode | |
| Dispersion and stability | Dispersion is very good, stability lasts more than three month. | |

Example 18

Characterization of Carbon Nanotube-Containing Nanofluids

To characterize the nanofluids of the present invention, three parameters were determined, including total acid number, pour point, and viscosity. Total acid number ("TAN") per ASTM D664 was determined for the oil based fluids (DURASYN®166 and ROYCO® 808 oils). TAN is to quantify the amount of acidic constituents present in a petroleum product and expressed in milligrams of potassium hydroxide needed to neutralize the acidic constituents in one gram of nanofluid. As shown in Table 18, all nanofluids tested have very low TAN, indicating that carbon nanotubes have low chemical activity and are stable and compatible with the two synthetic petroleum oils.

The viscosities of the nanofluids were determined at 40 and 100° C. per ASTM D445. For comparison, the viscosities of original ROYCO® 808 and DURASYN® 166 oils were also measured. ROYCO® 808 and DURASYN® 166 oils have viscosities of 2-3 and 5-6 centistokes, respectively. As shown in Table 18, carbon nanotubes have dramatic affect on the viscosity of oil-based nanofluids. Addition of 0.25% by weight of SWNT in ROYCO® 808 increases the viscosity to 53-54 centistokes at 40° C.

Pour point is the lowest temperature at which a fluid remains pourable. Pour points were determined per ASTM D97 for the ROYCO® 808 and DURASYN® 166 based nanofluids. As shown in Table 18, all nanofluids tested have relatively low pour points.

TABLE 18

Characterization of Carbon Nanotube-Containing Nanofluids.

| Fluid | Total Acid No. (mg KOH/g) | Vis at 40° C. (cSt.) | Vis at 100° C. (cSt.) | Pour Point (° C.) |
|---|---|---|---|---|
| ROYCO ® 808 + 0.25% D-SWNT-CNI | 0.08 | 53.88 | 8.16 | <−63 |
| ROYCO ® 808 + 0.25% D-SWNT-CNI DMF | 0.09 | 54.11 | 11.48 | <−63 |
| DURASYN ® 166 (PAO) + 0.5% D-SWNT-CNI | <0.05 | 392.54 | 56.05 | <−63 |

Example 19

Preparation of Nanogreases Containing Surfactants

Lubricating nanogreases were prepared using carbon nanoparticles as a thickener.

The following is a typical procedure for preparing a nanogrease. A mixture of a polyalphaolefin with a viscosity of 6 cSt (11.4 g), a polyalphaolefin with a viscosity of 40 cSt (17.10 g), and a chemical dispersant (1.50 g) in a 100 mL beaker was heated on a hot plate with stirring until a homogenous solution was obtained. It typically takes about 10-20 min. Then, Carbolex single wall carbon nanotubes (4.46 g) were added to the mixture in a beaker and blended with a three-roll mill to optimum consistency. Total six nanogreases were prepared using one of following six chemical dispersants: OLOA 11002, AEROSOL® OT-S, C500, NaSul CA-HT3, Lz935, and FOA-5.

Example 20

Preparation of Nanogreases without a Surfactant

Lubricating nanogreases were prepared using carbon nanoparticles as a thickener. The following is a typical procedure for preparing a nanogrease. A mixture of a hydrophobic thermal transfer fluid and carbon nanoparticles was first mixed together. After heated to a temperature of about 150° C., the mixture was then passed multiple times through a three-roll mill until desired grease structure was obtained. Typically, this process was accomplished after three or four passes. The hydrophobic thermal transfer fluids (that is, the base oil blends) in all grease samples were calculated based on the known viscosities of the individual based oils so as to provide a base oil blend with a viscosity of about 142 to 151 cSt at 40° C.

Figure 2:
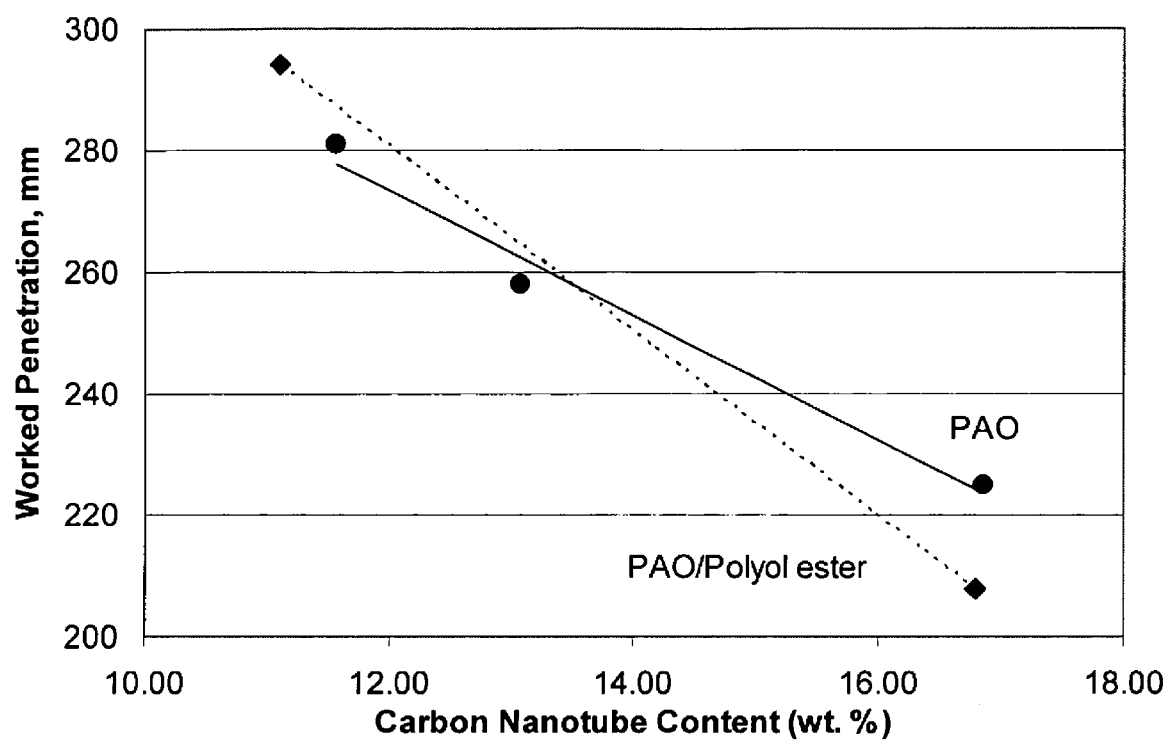
FIG. 2 shows the effect of base oil on thickening power of SWNT.
Figure 4:
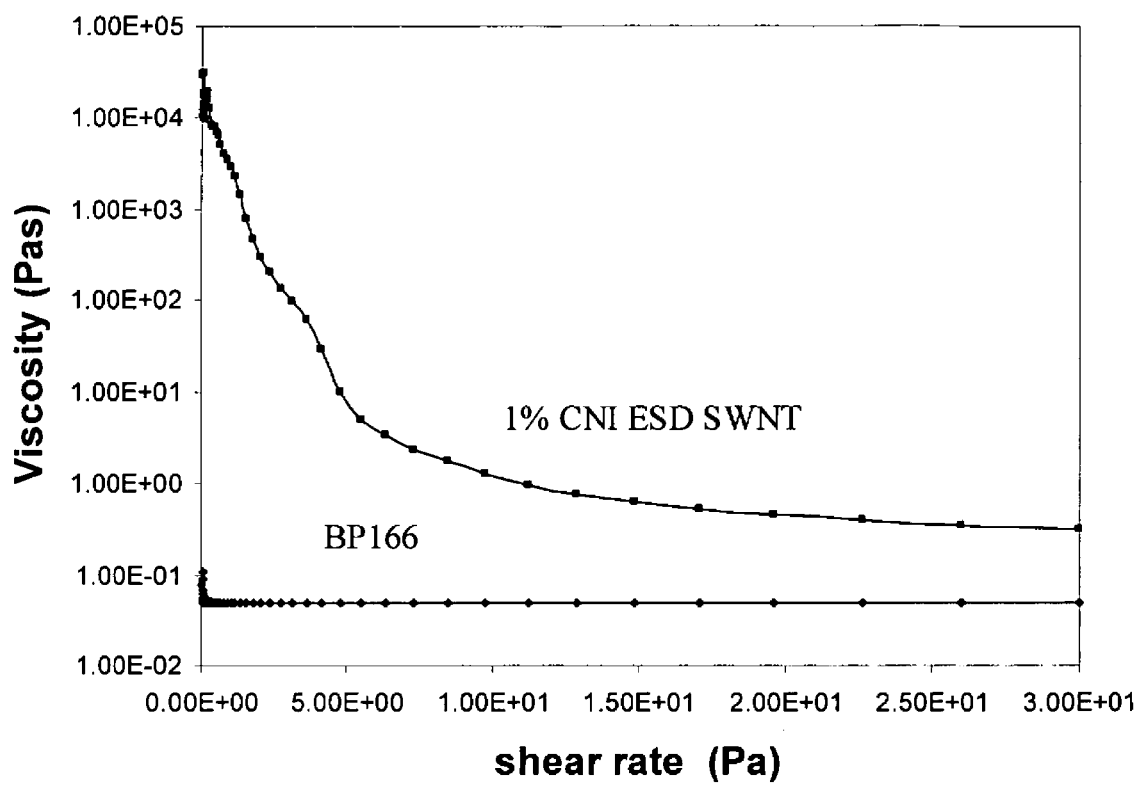
FIG. 4 shows the effect of shear rate on the viscosities of BP166 oil only and a carbon nanotube dispersion (1% SWNT) in BP166.
Figure 5:
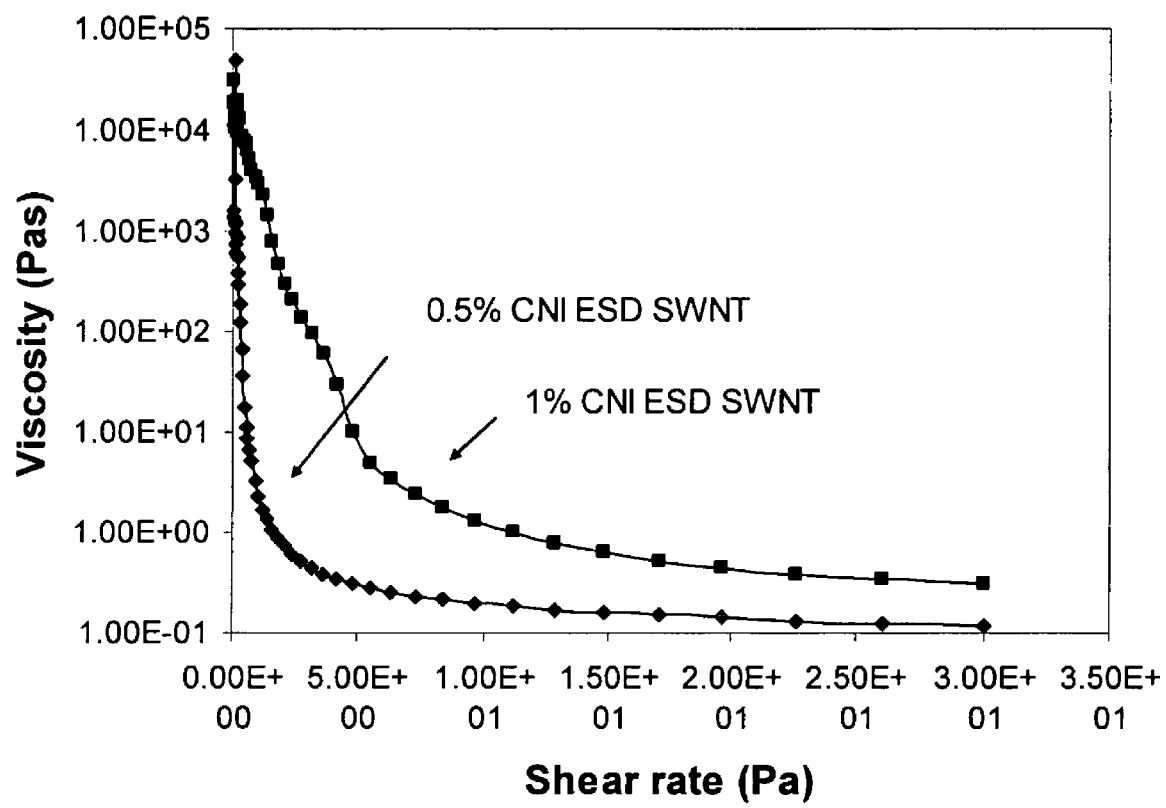
FIG. 5 shows the effect of shear rate on the viscosities of two SWNT dispersions in BP166, 0.5% and 1% SWNT-CNI.
Figure 6:
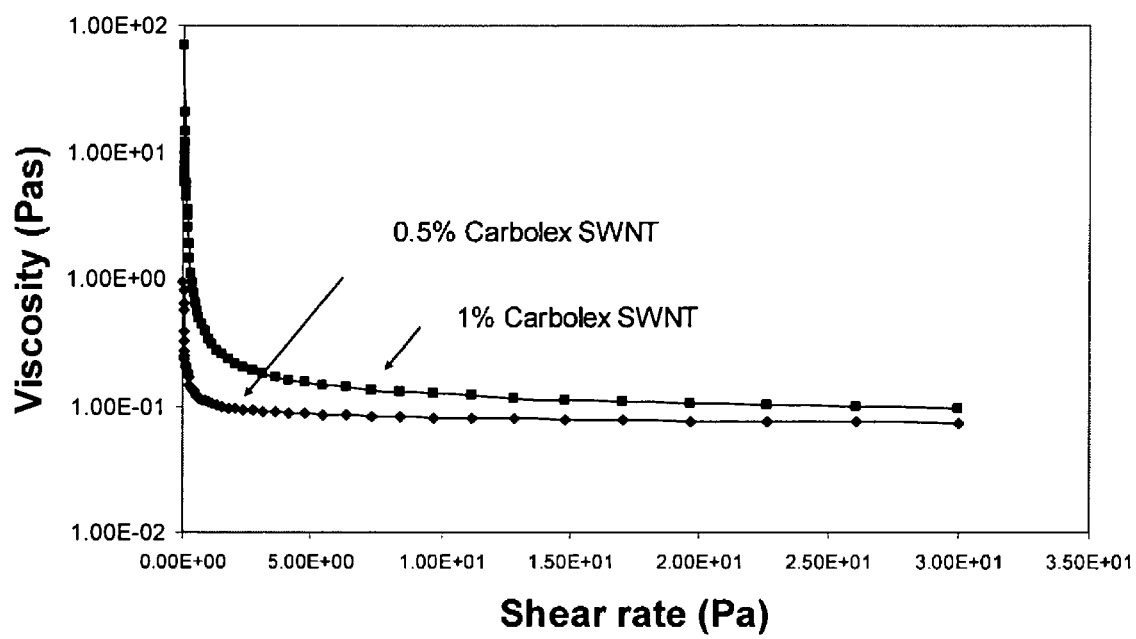
FIG. 6 shows the effect of shear rate on the viscosities of two SWNT dispersions in BP166, 0.5% and 1% SWNT-CAR.
Figure 7:
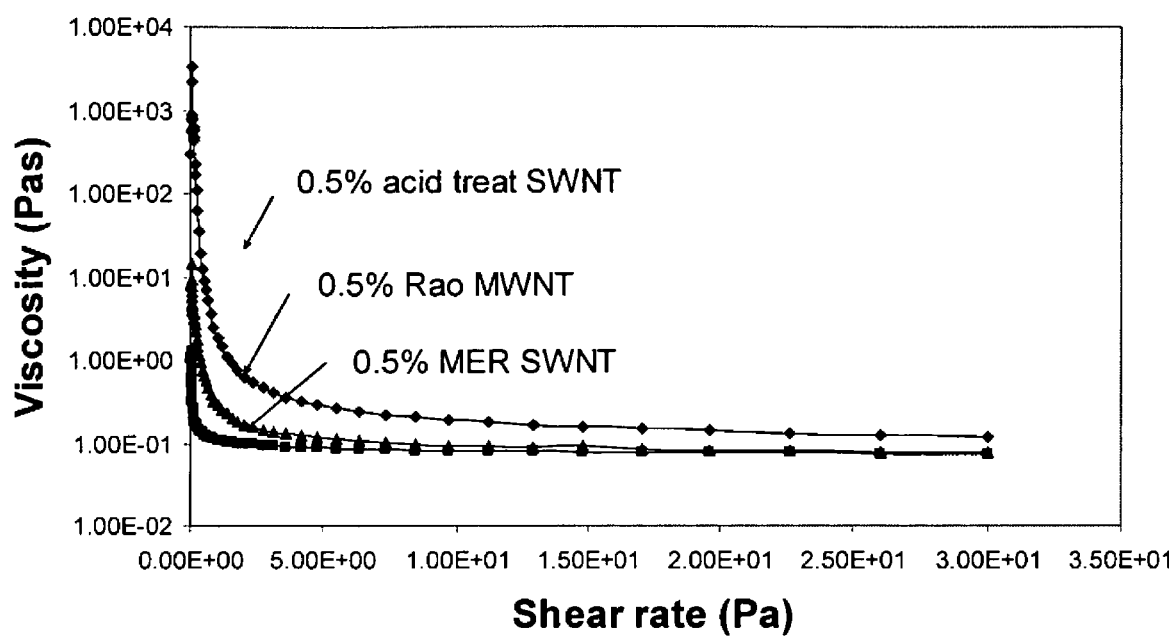
FIG. 7 shows the effect of shear rate on the viscosities of three carbon nanotube dispersions in BP166, 0.5% SWNT-MER, 0.5% acid treated SWNT-CNI, and 0.5% MWNT-RAO.
Figure 8:
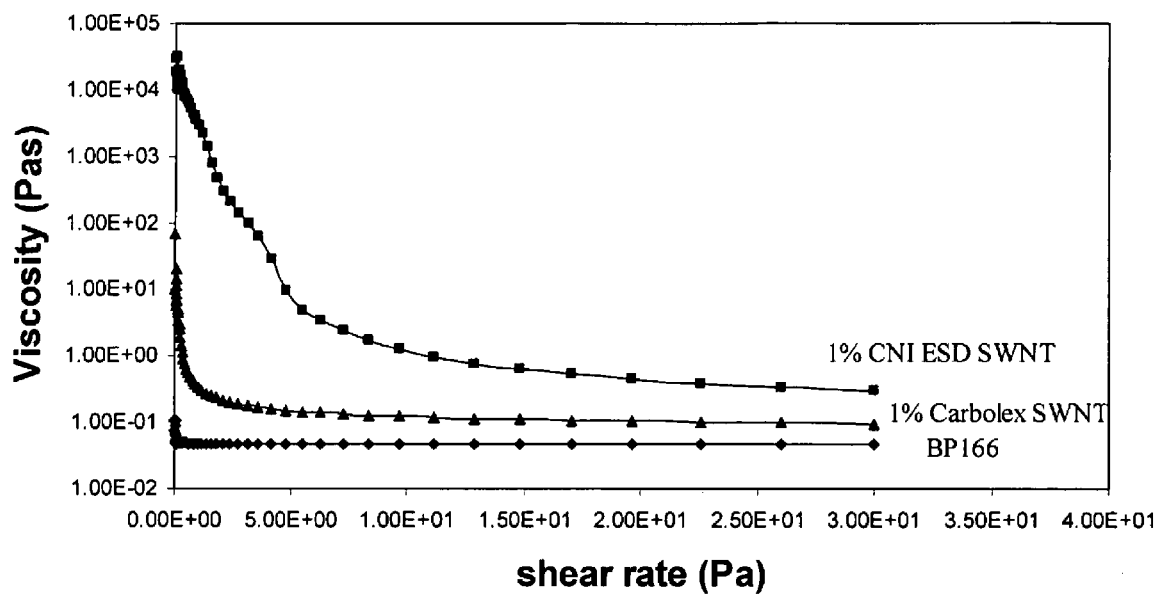
FIG. 8 shows the effect of shear rate on the viscosities of two SWNT dispersions in BP166, 1% SWNT-CNI and 1% SWNT-CAR.
Figure 9:
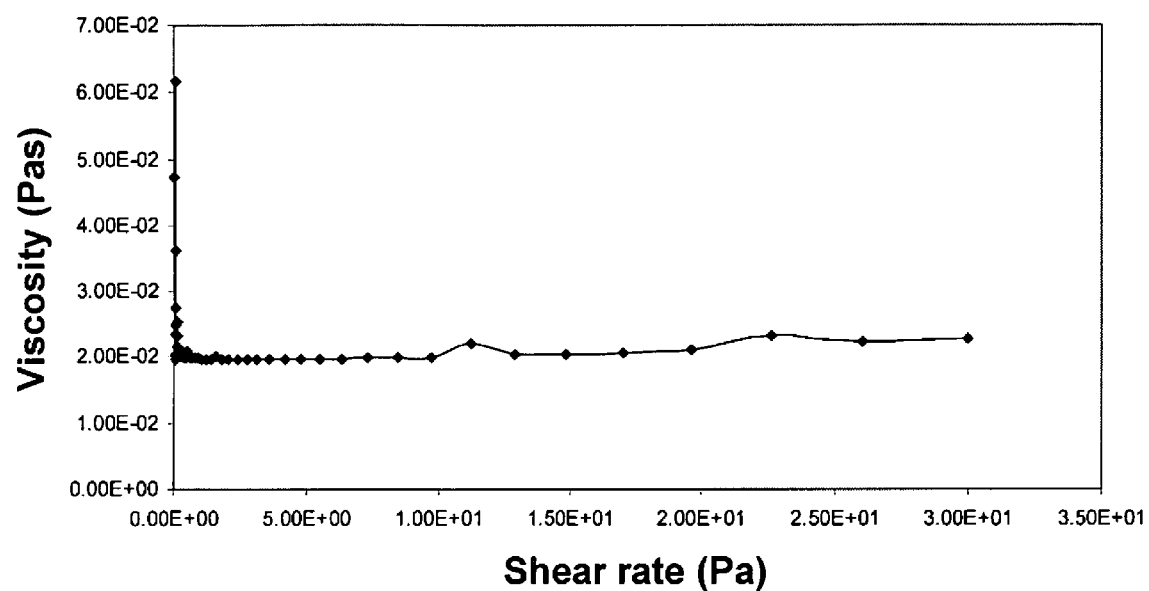
FIG. 9 shows the effect of shear rate on the viscosity of commercial Prestone.
Figure 10:
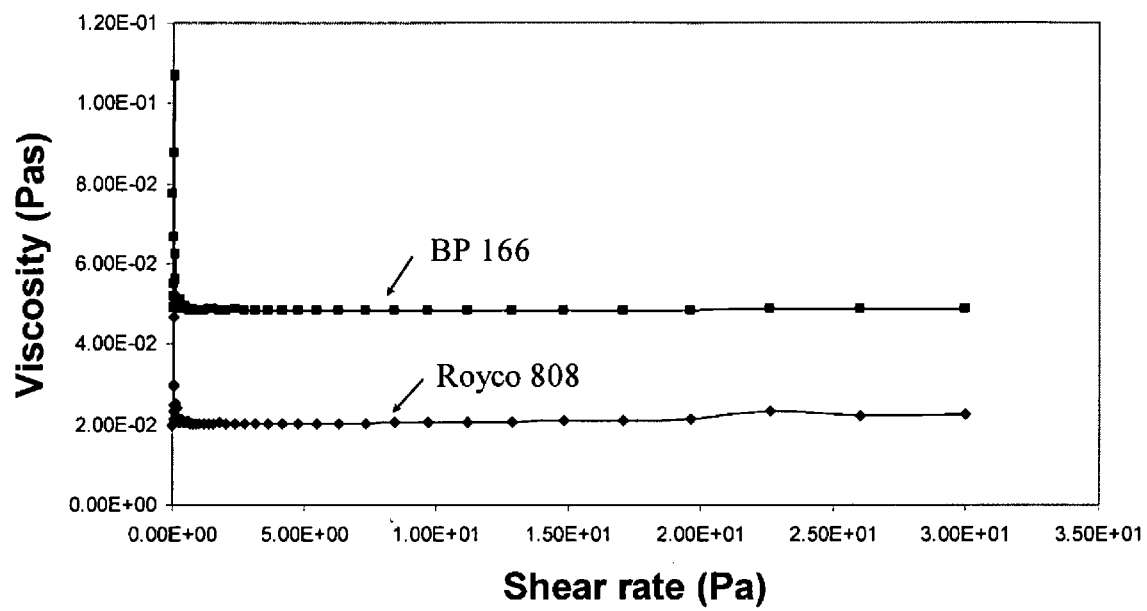
FIG. 10 shows the effect of shear rate on the viscosities1 of BP and ROYCO 808.

A series of such grease samples were prepared using both SWNT-CAR and MWNT-HMSI in various blends of base oils. These grease compositions were evaluated for unworked and worked (60 strokes) penetrations, and dropping point. Results are shown in FIGS. 1, 2 and 3.

Another series of seven greases were prepared with about 13% SWNT-CAR in PAO. The first six each contained 5% of one of six surfactants shown in Table 19. The seventh grease did not contain any surfactant. These seven greases were also evaluated for unworked and worked (60 strokes) penetrations, and dropping point. The results are summarized in Table 20.

TABLE 19

Surfactants Used in Making Nanogreases

| Surfactant Name | Supplier | Product Description |
|---|---|---|
| OLOA 11002 | Oronite Chemical Company | Not Available |
| Aerosol OT-S | Cytec Inc. | Sodium di-octyl sulfosuccinate |
| C500 | Crompton Petroleum Additives | Overbased calcium sulfonate |
| NaSul CA-HT3 | King Industries | Calcium sulfonate/succinate |
| NaSul 729 | King Industries | Neutral calcium sulfonate |
| Lz 935 | Lubrizol | Borated alkyl succinimide |
| FOA-5 | Octel Stareon Chemical | Ashless polymeric additive |

TABLE 20

Effect of Surfactants on SWNT-Containing Nanogreases

| Sample Number | 5-1 | 5-2 | 5-3 | 5-4 | 5-5 | 5-6 | 5-7 |
|---|---|---|---|---|---|---|---|
| PAO, 6 cSt (g) | 11.40 | 11.40 | 11.40 | 11.40 | 11.40 | 11.40 | 12.00 |
| PAO, 40 cSt (g) | 17.10 | 17.10 | 17.10 | 17.10 | 17.10 | 17.10 | 18.00 |
| OLOA 11002 (g) | 1.50 | | | | | | |
| Aerosol OT-S (g) | | 1.50 | | | | | |
| C500 (g) | | | 1.50 | | | | |
| NaSul CA-HT3 (g) | | | | 1.50 | | | |
| Lz 935 (g) | | | | | 1.50 | | |
| FOA-5 (g) | | | | | | 1.50 | |
| SWNT-CAR (g) | 4.46 | 4.52 | 4.47 | 4.52 | 4.51 | 4.52 | 4.51 |
| SWNT-CAR (%) | 12.94 | 13.09 | 12.97 | 13.09 | 13.07 | 13.09 | 13.07 |
| Surfactant (%) | 5.00 | 5.00 | 5.00 | 5.00 | 5.00 | 5.00 | 0.00 |
| Base Oil Blend Kinematic Viscosity @ 40° C. (cSt) | 142 | 142 | 142 | 142 | 142 | 142 | 142 |
| Penetration, ¼ scale, D1403 | | | | | | | |
| Unworked (mm) | 279 | 275 | 283 | 307 | 307 | 309 | 251 |
| w/60 (mm) | 294 | 268 | 290 | 305 | 320 | 330 | 258 |
| Dropping Point (° C., D2265) | >271 | >271 | >271 | >271 | >271 | >271 | >271 |

Example 21

Preparation of Nanogreases without a Surfactant

Lubricating nanogreases were prepared using carbon nanoparticles as a thickener. The following is a typical procedure for preparing a nanogrease. A mixture of a hydrophobic thermal transfer fluid and carbon nanoparticles was first mixed together. After heated to a temperature of about 150° C., the mixture was then passed multiple times through a three-roll mill until desired grease structure was obtained. Typically, this process was accomplished after three or four passes. The hydrophobic thermal transfer fluids (that is, the base oil blends) in all grease samples were calculated based on the known viscosities of the individual based oils so as to provide a base oil blend with a viscosity of about 142 to 151 cSt at 40° C.

Example 22

Characterization of Nanogreases

One important physical aspect of a grease is the stability of the grease structure as provided by the oil thickener, that is, carbon nanoparticles in the present invention. Two tests that measure this aspect of grease rheology were chosen to evaluate those nanogrease: dropping point (ASTM D2265) and oil separation (FTM 321.3). The ASTM. dropping point is the temperature at which a grease passes from a semi-solid to a liquid state under the conditions of the test. In this experiment, the dropping point was determined by heating the sample to the point being the temperature at which the first drop of material falls from the test cup. For the nanogrease with 5% by weight of SWNT in DURASYN® 166, it was not possible to determine its dropping point. The grease started to be carbonized at 316° C.

Oil separation test was run at 100° C. for 30 hrs. For the nanogrease with 5% by weight of SWNT in DURASYN® 166, no visible oil has separated from grease.

As shown in Table 21, both nanogreases have very high dropping point, indicating that these greases are very stable and do not melt.

TABLE 21

Characterization of Nanogreases

| Test Description | Dropping Point | Oil Separation % (wt) |
|---|---|---|
| 3% D-SWNT-CNI in DURASYN ® 166 | 265 | 16.6 |
| 5% D-SWNT-CNI in DURASYN ® 166 | Did not drop | 0.67 |

Four nanogreases were tested for providing an NLGI No. 2 grade consistency. The compositions of these four nanogreases and their testing results are summarized in Table 22. SWNT provides about twice as much thickening power as MWNT. Three of these greases have good shear stability based on the amount of penetration change between the worked 60 strokes value and the worked 100,000 strokes value. The grease containing SWNT-CAR has the best shear stability among the four nanogreases. The dropping points are all above 271° C. and oil separation as determined by FTM 321.3 (cone leakage procedure) was good for all greases evaluated. Specifically, oil separation held relatively constant over the three test temperatures spanning 100 to 177° C.

All four greases were passive to copper at both 100 and 177° C. as determined by ASTM D4048. This is significant since it has been previously determined that graphites in greases typically become aggressive towards copper at high temperatures, such as 177° C.

The extreme pressure ("EP") and antiwear ("AW") properties of these four greases were also tested. All four greases performed better than most additive-free greases from similar based oils and other thickener systems.

To further evaluate the EP/AW properties of these greases, testing was done using the Optimol SRV. Two SRV test procedures were used. In the Mstep procedure a steel ball is oscillated on a steel flat disk surface with a layer of grease between them. The oscillatory frequency is 50 Hz; the oscillatory stroke length is set at 1.00 mm. Temperature at the ball/disk surface is held at 80° C. The loading is slowly increased at two minute durations through 25 N, 50 N, 100 N, 150 N, 200 N, and 300 N as a break-in sequence. Then the load is reduced to 25 N and the break-in sequence is repeated. When 3-N is reached, the loading is increased at 100 N increments until failure occurs. Failure is signaled by either a significant spiking in the coefficient of friction, a sudden reduction in stroke length, or both. The maximum passing load is reported. In the ASTM D5707 wear test, the same conditions of frequency, stroke length, and temperature were used. However, after a similar break-in procedure the load is set to predetermined level (in this case 200 N) and that load is maintained for two hours. At the conclusion of the test, the wear scar diameter on the steel ball is measured. The trace of coefficient fraction vs. time is also examined to assist in evaluating the evolution of wear as a function of time during the two hour test period.

TABLE 22

Characterization of Nanogreases

| Sample Number | 9-1 | 9-2 | 10-1 | 10-2 |
|---|---|---|---|---|
| PAO, 6 cSt (g) | 35.36 | | 32.00 | |
| PAO, 40 cSt (g) | 53.04 | 44.75 | 48.00 | 40.50 |
| Esterex NP4104 (g) | | 44.75 | | 40.50 |
| SWNT-CAR (g) | 11.60 | 10.50 | | |
| MWNT-HMSI (g) | | | 20.00 | 19.00 |
| Carbon nanotube thickener (%) | 11.60 | 10.50 | 20.00 | 19.00 |
| Base Oil Blend Kinematic Viscosity @ 40° C. (cSt) | 142.00 | 142.00 | 151.00 | 151.00 |
| Penetration, ¼ scale, D1403 | | | | |
| Unworked (mm) | 286 | 270 | 278 | 292 |
| w/60 (mm) | 285 | 269 | 279 | 292 |
| w/100,000 (mm) | 290 | 297 | 308 | ND |
| Dropping Point (° C., D2265) | | | | |
| Oil Separation (wt. %, FTM 321.3) | | | | |
| 24 hr, 100° C. | 3.56 | 0.79 | 4.22 | ND |
| 24 hr, 150° C. | 5.06 | 2.81 | 4.37 | ND |
| 24 hr, 177° C. | 5.93 | 4.42 | 5.23 | ND |
| Four Ball Wear, D2266 (mm) | 0.55 | 0.75 | 0.80 | 0.74 |
| Four Ball EP, D2596 | | | | |
| LNSL (Kg) | 100 | 63 | 80 | 100 |
| Weld Load (Kg) | 200 | 200 | 315 | 250 |
| Load Wear Index | 41.34 | 29.43 | 48.02 | 47.60 |
| Copper Corrosion, D4048 | | | | |
| 24 hr, 100° C. | 1B | 1B | 1B | 1B |
| 24 hr, 177° C. | 1B | 1B | 1B | 1B |
| Optimol SRV Mstep Test, maximum passing load, N | 300.00 | 600.00 | 300.00 | |
| Optimol SRV Wesr Test, ball scar diameter, D5707 | | 0.55 | | |

Example 23

Determination of the Thermal Conductivities of Carbon Nanotube-Containing Fluids The thermal conductivities of the nanolubricants and nanogreases of the present invention were measured at room temperature using a hot disk thermal constant analyzer (Swedish Inc.). Sensor depth was set at 6 mm. Out power was set at 0.025 W. Means time was set at 16 s. Radius was set at 2.001 mm. TCR was set at 0.00471/K. Disk type of kapton was used. Tem. drift rec was on. As shown in Table 23, the thermal conductivity is increased as the amount of carbon nanoparticles increases.

TABLE 23

The thermal conductivity of nanolubricants and nanogreases

| Detail description | TC value |
|---|---|
| DURASYN ® 166 with 5 w % OLOA 11002 | 0.153 |
| ROYCO ® 500 with 0.1 w % MWNT-HMSI and 5 w % AEROSOL ® OT-MSO | 0.182 |
| DURASYN ® 166 with 0.1 w % MWNT-HMSI and | 0.186 |

TABLE 23-continued

The thermal conductivity of nanolubricants and nanogreases

| Detail description | TC value |
|---|---|
| 5 w % AEROSOL ® OT-MSO | |
| ROYCO ® 500 with 0.1 w % MWNT-MER and | 0.179 |
| 5 w % AEROSOL ® OT-MSO | |
| ROYCO ® 500 with 0.1 w % MWNT-HMSI and | 0.177 |
| 5 w % AEROSOL ® TR70% | |
| DURASYN ® 166 with 3 w % D-SWNT-CNI and | 0.227 |
| 5 w % OLOA 11002 | |

Example 24

Determination of pH Values of Carbon Nanoparticle Suspensions

The pH values of carbon nanoparticle suspensions in DURASYN® 166 and ROYCO® 500 fluids were measured using UP-10 pH meter (Denver Instrument at Denver, Colo.). In this experiment, the concentration of carbon nanotubes was varied from 0.02 to 1% by weight. In addition, five different kinds of carbon nanotubes were used, including three SWNTs, that is, acid-treated, untreated, and purified F-SWNT, and two MWNTs, that is, helix and catalytic. For comparison, the pH values of two original fluids, DURASYN® 166 and ROYCO® 500, were also determined. As summarized Table 24, vast majority of the samples are neutral and have their pH values close to 7. For those samples which have their pH values off the neutral pH, it may sometimes be beneficial to neutralize the samples to bring their pH values to 7 to prevent potential corrosion caused by acidity or basicity.

TABLE 23 pH values of Carbon Nanotube Suspensions

| Detail Description | pH value |
|---|---|
| DURASYN ® 166 | 8.0 |
| ROYCO ® 500 | 8.0 |
| DURASYN ® 166 with 0.02 w % acid treated D-SWNT-CNI and 5 w % OLOA 11002 | 6.9 |
| DURASYN ® 166 with 0.01 w % acid treated D-SWNT-CNI and 5 w % OLOA 11002 | 7.5 |
| DURASYN ® 166 with 0.5 w % untreated D-SWNT-CNI | 6.2 |
| DURASYN ® 166 with 1 w % untreated D-SWNT-CNI and 5 w % OLOA11002 | 8.2 |
| DURASYN ® 166 with 0.5 w % untreated D-SWNT-CNI and 45 w % DMF | 6.6 |
| DURASYN ® 166 with 0.25 w % F-SWNT-CNI and 5 w % DMF | 5.2 |
| DURASYN ® 166 with 0.25% acid treated D-SWNT-CNI and 45 w % DMF | 6.4 |
| ROYCO ® 500 with 0.1 w % MWNT-HMSI and 5 w % AEROSOL ® OT-MSO | 7.0 |
| DURASYN ® 166 with 0.1 w % MWNT-HMSI and 5 w % AEROSOL ® OT-MSO | 7.2 |
| ROYCO ® 500 with 0.1 w % MWNT-MER and 5 w % AEROSOL ® OT-MSO | 8.0 |
| ROYCO ® 500 with 0.1 w % MWNT-HMSI and 5 w % AEROSOL ® TR70% | 7.9 |

In summary, several surfactants were used in the nanofluids of the present invention, including OLOA 11002, AEROSOL® OT-S, OT-MSO, and TR-75%, AE C500, NaSul CA-HT3, Lz935, and FOA-5. Among the surfactants, AEROSOL® OT-MSO and TR-75%, both of which are sulfosuccinate surfactants, are the most effective dispersants. The nanofluids with these two surfactants also have significantly enhanced stability.

The examples set forth above are provided to give those of ordinary skill in the art with a complete disclosure and description of how to make and use the preferred embodiments of the compositions and the methods, and are not intended to limit the scope of what the inventors regard as their invention. Modifications of the above-described modes for carrying out the invention that are obvious to persons of skill in the art are intended to be within the scope of the following claims. All publications, patents, and patent applications cited in this specification are incorporated herein by reference as if each such publication, patent or patent application were specifically and individually indicated to be incorporated herein by reference.

What is claimed is:

1. A stable nanofluid comprising a hydrophobic thermal transfer fluid and carbon nanotubes dispersed in the thermal transfer fluid, wherein the carbon nanotubes have not been chemically modified or functionalized, wherein the nanofluid is free of a surfactant and has a shear stability based on the amount of change in penetration, as determined by D 1403, ¼ scale, between the worked 60 strokes value and the worked 100,000 strokes value is no greater than 10%.

2. The nanofluid of claim 1, wherein the carbon nanotubes have a solubility of no less than 0.01% in the hydrophobic thermal transfer fluid.

3. The nanofluid of claim 1 further comprising one or more chemical additives.

4. The nanofluid of claim 1, wherein the hydrophobic thermal transfer fluid is selected from the group consisting of petroleum distillates, synthetic petroleum oils, greases, gels, oil-soluble polymer composition, vegetable oils, and combinations thereof.

5. The nanofluid of claim 1, wherein the hydrophobic thermal transfer fluid has a viscosity of from about 2 to about 800 centistokes.

6. The nanofluid of claim 1, wherein the hydrophobic thermal transfer fluid is a synthetic petroleum oil.

7. The nanofluid of claim 6, wherein the synthetic petroleum oil is selected from the group consisting of polyalphaolefins, polyol esters, and combinations thereof.

8. The nanofluid of claim 7, wherein the polyol ester is pentaerythritol ester, trimethylolpropane ester, or neopentyl glycol ester.

9. The nanofluid of claim 7, wherein the synthetic petroleum oil is a polyalphaolefin or mixture thereof.

10. The nanofluid of claim 1, wherein the amount by weight of the carbon nanotubes is no greater than about 30%.

11. The nanofluid of claim 10, wherein the amount of carbon nanotubes is no greater than about 15% by weight.

12. The nanofluid of claim 1, wherein the carbon nanotube is a single-walled carbon nanotube (SWNT).

13. The nanofluid of claim 1, wherein the carbon nanotube is a multi-walled carbon nanotube (MWNT).

14. The nanofluid of claim 1, wherein the hydrophobic thermal transfer fluid is a grease.

15. The nanofluid of claim 1, wherein the amount of hydrophobic thermal transfer fluid is about 70 to about 98% by weight.

16. The nanofluid of claim 1, wherein the oil separation as determined by FTM 321.3 (cone leakage procedure), is less than 6% by weight for 24 hours at 100° C. and at 177° C.

17. The nanofluid of claim 1, wherein the copper corrosion as determined by ASTM D4808 for 24 hours at 100° C. and at 177° C. is no more tarnished than a 1B.

18. A stable nanogrease comprising a hydrophobic thermal transfer fluid and carbon nanotubes dispersed in the thermal transfer fluid, wherein the carbon nanotubes have not been chemically modified or functionalized, wherein the nanogrease is free of a surfactant and has a shear stability based on the amount of change in penetration, as determined by D 1403, ¼ scale, between the worked 60 strokes value and the worked 100,000 strokes value is no greater than 10%.

19. The nanogrease of claim 18, wherein the carbon nanotube is a single-walled carbon nanotube.

20. The nanogrease of claim 18, wherein the carbon nanotube is a multi-walled carbon nanotube.

21. The nanogrease of claim 18, wherein the amount of carbon nanotubes is no greater than about 30% by weight.

22. The nanogrease of claim 18, wherein the hydrophobic thermal transfer fluid is selected from mineral oils, synthetic petroleum oils, diesters, polyalphaolefins, polyol esters, polyglycols, and combinations thereof.

23. The nanogrease of claim 22, wherein the hydrophobic thermal transfer fluid is a mineral oil, or combinations thereof.

24. The nanogrease of claim 22, wherein the hydrophobic thermal transfer fluid is a diester, or combinations thereof.

25. The nanogrease of claim 22, wherein the hydrophobic thermal transfer fluid is a polyglycol, or combinations thereof.

26. The nanogrease of claim 18, wherein the hydrophobic thermal transfer fluid is a synthetic petroleum oil, or combinations thereof.

27. The nanogrease of claim 26, wherein the synthetic petroleum oil is selected from the group consisting of alkylaryls, silicones, polyalphaolefins, polyol esters, and combinations thereof.

28. The nanogrease of claim 27, wherein the synthetic petroleum oil is selected from the group consisting of polyalphaolefins, polyol esters, and combinations thereof.

29. The nanogrease of claim 28, wherein the polyol ester is pentaerythritol ester, trimethylolpropane ester, or neopentyl glycol ester.

30. The nanogrease of claim 27, wherein the synthetic petroleum oil is a polyalphaolefin, or combinations thereof.

31. The nanogrease of claim 27, wherein the synthetic petroleum oil is a polyol ester, or combinations thereof.

32. The nanogrease of claim 18, wherein the amount of hydrophobic thermal transfer fluid is about 70 to about 98% by weight.

33. The nanogrease of claim 18, wherein the amount of carbon nanotubes is no greater than 15% by weight.

34. The nanogrease of claim 18, wherein the hydrophobic thermal transfer fluid is a polyalphaolefin and combinations thereof, and the carbon nanotubes are single walled nanotubes.

35. The nanogrease of claim 34, wherein the amount of carbon nanotubes is no greater than 15% by weight.

36. The nanogrease of claim 18, wherein the oil separation as determined by FTM 321.3 (cone leakage procedure), is less than 6% by weight for 24 hours at 100° C. and at 177° C.

37. The nanogrease of claim 18, wherein the copper corrosion as determined by ASTM D4808 for 24 hours at 100° C. and at 177° C. is no more tarnished than a 1B.

* * * * *

UNITED STATES PATENT AND TRADEMARK OFFICE
CERTIFICATE OF CORRECTION

| | | |
|---|---|---|
| PATENT NO. | : 7,871,533 B1 | Page 1 of 1 |
| APPLICATION NO. | : 11/494954 | |
| DATED | : January 18, 2011 | |
| INVENTOR(S) | : Haiping Hong and John Andrew Waynick | |

It is certified that error appears in the above-identified patent and that said Letters Patent is hereby corrected as shown below:

Title Page, item (75) Inventors: Hong Haiping; should say – Inventors: Haiping Hong Signed and Sealed this
First Day of March, 2011

David J. Kappos
*Director of the United States Patent and Trademark Office*